US008367005B2

(12) United States Patent
Ikeda et al.

(10) Patent No.: US 8,367,005 B2
(45) Date of Patent: Feb. 5, 2013

(54) GAS PROCESSING APPARATUS, GAS PROCESSING SYSTEM, AND GAS PROCESSING METHOD, AND EXHAUST GAS PROCESSING SYSTEM AND INTERNAL COMBUSTION ENGINE USING THE SAME

(75) Inventors: Yuji Ikeda, Kobe (JP); Shinobu Makita, Kobe (JP)

(73) Assignee: Imagineering, Inc., Kobe-shi, Hyogo (JP)

( * ) Notice: Subject to any disclaimer, the term of this patent is extended or adjusted under 35 U.S.C. 154(b) by 283 days.

(21) Appl. No.: 12/668,852

(22) PCT Filed: Jul. 12, 2008

(86) PCT No.: PCT/JP2008/062637
§ 371 (c)(1),
(2), (4) Date: Jan. 12, 2010

(87) PCT Pub. No.: WO2009/008519
PCT Pub. Date: Jan. 15, 2009

(65) Prior Publication Data
US 2010/0200390 A1  Aug. 12, 2010

(30) Foreign Application Priority Data

Jul. 12, 2007  (JP) ................................ 2007-183754

(51) Int. Cl.
H05H 1/00 (2006.01)
H05H 1/24 (2006.01)
B01J 19/12 (2006.01)
G05B 15/00 (2006.01)
G05B 1/00 (2006.01)

(52) U.S. Cl. .......................... 422/186; 422/116; 422/105

(58) Field of Classification Search .................. 422/186, 422/116, 105
See application file for complete search history.

(56) References Cited

U.S. PATENT DOCUMENTS

| 3,934,566 A | 1/1976 | Ward |
| 4,138,980 A | 2/1979 | Ward |

(Continued)

FOREIGN PATENT DOCUMENTS

| JP | 51-77719 | 7/1976 |
| JP | 57-119164 A | 7/1982 |

(Continued)

OTHER PUBLICATIONS

English-language abstract of JP57-148022.*

(Continued)

*Primary Examiner* — Keith Hendricks
*Assistant Examiner* — Colleen M. Raphael
(74) *Attorney, Agent, or Firm* — Westerman, Hattori, Daniels & Adrian, LLP

(57) ABSTRACT

A gas processing apparatus for processing a gas using plasma is highly versatile and capable of rapidly processing a large quantity of gas that includes particularly an aromatic compound or other component that is difficult to process. The gas processing apparatus comprises a plasma equipment series comprising a plurality of gas processing units arranged in series on a gas flow channel; and a control section for controlling the operation of each unit of plasma equipment of the plasma equipment series. Each of the units of plasma equipment comprises a cavity composed of an electrical conductor and communicated with the gas flow channel; a plasma generator for generating plasma within the cavity; and microwave radiator for radiating microwaves to the plasma generated by the plasma starting section. The control section selects the number of units of plasma equipment to operate according to a component of the introduced gas.

18 Claims, 13 Drawing Sheets

U.S. PATENT DOCUMENTS

| | | | | |
|---|---|---|---|---|
| 4,926,001 | A * | 5/1990 | Alagy et al. | 585/500 |
| 5,270,515 | A * | 12/1993 | Long | 219/687 |
| 5,288,969 | A * | 2/1994 | Wong et al. | 219/121.52 |
| 5,418,430 | A * | 5/1995 | Bayliss | 315/111.21 |
| 5,490,973 | A * | 2/1996 | Grothaus et al. | 422/186.04 |
| 5,646,489 | A * | 7/1997 | Kakehi et al. | 315/111.21 |
| 5,750,823 | A * | 5/1998 | Wofford et al. | 588/316 |
| 5,845,480 | A | 12/1998 | DeFreitas et al. | |
| 6,007,742 | A * | 12/1999 | Czernichowski et al. | 204/157.15 |
| 6,029,602 | A * | 2/2000 | Bhatnagar | 118/723 ME |
| 6,126,779 | A * | 10/2000 | Gillespie et al. | 422/186.29 |
| 6,329,628 | B1 * | 12/2001 | Kuo et al. | 219/121.54 |
| 6,545,420 | B1 * | 4/2003 | Collins et al. | 118/723 IR |
| 6,806,439 | B2 * | 10/2004 | Uhm et al. | 219/121.59 |
| 6,888,040 | B1 * | 5/2005 | Shufflebotham et al. | 423/240 R |
| 2003/0206833 | A1* | 11/2003 | Obee et al. | 422/24 |
| 2007/0209634 | A1 | 9/2007 | Minami | |

FOREIGN PATENT DOCUMENTS

| | | | |
|---|---|---|---|
| JP | 57-148022 A | 9/1982 | |
| JP | 7-012037 A | 1/1995 | |
| JP | 2000-179412 A | 6/2000 | |
| JP | 2000-325734 A | 11/2000 | |
| JP | 2001-300296 A | 10/2001 | |
| JP | 2002-195151 A | 7/2002 | |
| JP | 2002-295259 A | 10/2002 | |
| JP | 2002-295264 A | 10/2002 | |
| JP | 2004-216231 A | 8/2004 | |
| JP | 2005-171812 A | 6/2005 | |
| JP | 2005-246353 A | 9/2005 | |
| JP | 2005-319357 A | 11/2005 | |
| JP | 2006-132518 A | 5/2006 | |
| JP | 2006-187766 A | 7/2006 | |
| JP | 2007-113570 A | 5/2007 | |
| JP | 2007-270824 B1 | 10/2007 | |
| JP | 2008-036080 A | 2/2008 | |
| WO | WO 2007048994 A1 * | 5/2007 | |
| WO | 2008/035448 A1 | 3/2008 | |

OTHER PUBLICATIONS

English-language abstract of JP-H07-012037.*

International Search Report of PCT/JP2008/062637, mailing date of Aug. 5, 2008.

McAdams, R.; "Prospects for non-thermal atmospheric plasmas for pollution abatement"; Journal of Physics D: Applied Physics., 34, (2001); pp. 2810-2821. XP-002629705.

Mizeraczyk, Jerzy et al.; "Hazardous gas treatment using atmospheric pressure microwave discharges"; Plasma Physics and Controlled Fusion, 47, (2005), pp. B589-B602.

Uhm, H. S. et al.; "A microwave plasma torch and its applications"; Plasma Sources Science and Technology, 15, (2006), pp. S26-S34.

International Search Report of PCT/JP2009/054965, mailing date Jun. 9, 2009 issued in related U.S. Appl. No. 12/881,917.

International Search Report of PCT/JP2008/062642, mailing date of Sep. 2, 2008 issued in related U.S. Appl. No. 12/668,826.

* cited by examiner

GAS PROCESSING APPARATUS, GAS PROCESSING SYSTEM, AND GAS PROCESSING METHOD, AND EXHAUST GAS PROCESSING SYSTEM AND INTERNAL COMBUSTION ENGINE USING THE SAME

TECHNICAL FIELD

The disclosure relates to a gas processing apparatus, system, and method for processing gas using plasma, and particularly relates to a gas processing apparatus, system, and method for using plasma to process gas that contains an aromatic organic compound or the like.

BACKGROUND OF THE INVENTION

A gas processing apparatus has been proposed in the past for processing gas using plasma in-plant or end-of-pipe. Such a gas processing apparatus has its origin in an apparatus that utilizes a technique of ozone generation by dielectric barrier discharge, and various improvements have been made to the apparatus.

For example, Patent Document 1 discloses a gas processing apparatus as an apparatus that utilizes the most classic technique, in which parallel panel-shaped dielectric barrier electrodes are used to generate plasma by a dielectric barrier discharge, and a gas is introduced between the electrodes.

Patent Document 2 discloses a device configured so as to perform silent electric discharge using coaxial electrodes.

Patent Document 3 discloses a device in which a mesh-shaped dielectric barrier electrode is used, and a gas is introduced over the mesh.

Patent Document 4 discloses a gas processing apparatus in which a plasma torch for generating a high-temperature plasma is used to blow a plasma in an atmosphere in which a dioxin species is present, and the dioxin species is heat-processed.

Patent Document 5 discloses an apparatus in which dielectric beads are packed between the center electrode and outside ground electrode of a coaxial electrode pair, surface discharge is performed on the surfaces of the beads to generate a plasma, and the plasma is used for gas processing.

Numerous other attempts have been made to develop a gas processing apparatus in which plasma and a binder or catalyst are used jointly.

[Patent Document 1] Japanese Patent Application Laid-open Publication No. 2000-325734
[Patent Document 2] Japanese Patent Application Laid-open Publication No. 2001-300296
[Patent Document 3] Japanese Patent Application Laid-open Publication No. 2006-187766
[Patent Document 4] Japanese Patent Application Laid-open Publication No. 2004-216231
[Patent Document 5] Japanese Patent Application Laid-open Publication No. 2005-319357

SUMMARY OF THE INVENTION

In a gas processing apparatus such as described above that utilizes dielectric barrier discharge using parallel panel-shaped electrodes, the area in which the plasma is generated is limited to the space between the electrodes. Consequently, in order to process a large quantity of gas in this gas processing apparatus, the surface area of the electrodes must be increased, and the interval between the electrodes must be enlarged.

In this gas processing apparatus, the voltage applied to the electrodes in order for discharge to occur between the electrodes is dependent upon the interval between the electrodes, and the voltage needed increases the greater the distance between the electrodes is. Therefore, the ability to increase the interval between the electrodes is naturally limited, and the power supply is difficult to handle due to the high voltage required. Increasing the surface area of the electrodes also necessitates a large installation space.

It is therefore difficult to process large quantities of gas in this gas processing apparatus. Substances having high carbon-to-carbon bond strength, such as aromatic organic compounds, are particularly difficult to process rapidly and in large quantities.

The same such problems occur in a gas processing apparatus that utilizes dielectric barrier discharge using coaxial electrodes. A worse composition of such an gas processing apparatus is that the cross-sectional area of the gas flow channel is determined by the distance between the electrodes in coaxial electrodes. Since the distance between the electrodes is limited, a gas flow channel having a large cross-sectional area cannot be obtained, and large quantities of gas cannot be processed.

When mesh-shaped electrodes are used, the flow of gas is obstructed by the electrodes, thereby leading to loss of pressure. The larger the quantity of gas processed, or the higher the flow rate, the less the problem of pressure loss can be ignored. It is therefore difficult to process large quantities of gas rapidly in this gas processing apparatus as well.

In a gas processing apparatus that utilizes surface discharge using dielectric beads, and in a gas processing apparatus in which a binder or catalyst is jointly used, the dielectric beads, binder, or catalyst significantly hinders the flow of gas. It is therefore difficult to process large quantities of gas rapidly in this gas processing apparatus as well.

In a gas processing apparatus in which a plasma torch is used, outside air must either be pressurized and fed into the torch, or the region into which the plasma is blown must be depressurized in order to cause the plasma to be ejected from the plasma torch. In either case, a compressor, a depressurization device, or other equipment is necessary, and the apparatus is increased in size. These items of equipment also take on a large scale in order to process large quantities of gas, and a large amount of equipment is involved beyond that needed for plasma gas processing itself.

Moreover, in these conventional gas processing apparatuses, the thermal state of the plasma used in processing cannot be selected. Specifically, heat processing such as that performed using a plasma torch cannot be performed in such schemes as dielectric barrier discharge, and the processing performed by dielectric barrier discharge likewise cannot be performed by a plasma torch. Consequently, the gas processing apparatuses cannot process both gas components suited for processing using discharge plasma and gas components suited for heat processing, and thus lack versatility.

A gas processing apparatus is provided for processing a gas using plasma, wherein the gas processing apparatus is highly versatile and capable of rapidly processing a large quantity of gas that includes particularly an aromatic compound or other component that is difficult to process.

According to a first aspect, a gas processing apparatus using plasma comprises: a plasma equipment series having a plurality of units of plasma equipment arranged in series on a gas flow channel; and a controller controlling the operation of each of the units of plasma equipment of the plasma equipment series; wherein each of the units of plasma equipment has a plasma generator for generating plasma within a reaction chamber communicated with the gas flow channel; and an electromagnetic wave radiator for radiating electromagnetic waves to the plasma generated by the plasma generator; and the controller selects the number of units of plasma equipment to operate according to a component of the introduced gas.

In this gas processing apparatus, the units of plasma equipment in the plasma equipment series impart energy to the plasma by radiating electromagnetic waves to the plasma generated by the plasma generators, and the plasma is thereby expanded. Degradation of the component to be processed in the gas is performed by the expanded plasma. The process of the degradation reaction of the component to be processed varies according to the type of component, and adequate processing efficiency is sometimes not obtained by a single instance of plasma processing. In order to overcome this inefficiency, units of plasma equipment are arranged in a series, and the number of units of plasma equipment to be activated is selected according to the component. Plasma is generated by the selected number of units of plasma equipment, and the gas is thereby plasma-processed the same number of times as the selected number. Expanding the plasma and performing plasma processing a number of times according to the component enables a large quantity of gas to be processed in one pass.

According to a second aspect, the gas processing apparatus of the first aspect is preferably configured such that the plasma generator breaks bonds between carbon atoms and other atoms.

According to a third aspect, the gas processing apparatus of the first aspect is preferably configured such that the plasma generator breaks the bond of a carbon compound having at least one carbon-to-carbon bond and causes oxygen to bond where the carbon-to-carbon bond was broken.

Plasma expanded by electromagnetic waves enables a carbon compound having a carbon number of 2 or higher to be modified into a so-called oxygen-containing compound that includes oxygen in the molecule thereof.

According to a fourth aspect, the gas processing apparatus of the first through third aspects is preferably configured such that the controller activates two or more units of plasma equipment of the plasma equipment series when gas comprising a component having an aromatic six-member ring is conducted through the flow channel.

Components having an aromatic six-member ring are generally less reactive and impossible to adequately process using plasma. However, through the aspect described above, these components can be reliably degraded by two or more stages of processing using plasma. In general, extremely large-scale plasma equipment is used, and processing must be performed for a long time in order to achieve such results by one application of plasma processing, and drawbacks occur with regard to equipment durability, scale, and energy efficiency, but by dividing processing into two or more stages, large quantities can be rapidly processed by a combination of relatively small-scale units of plasma equipment. The load on each unit of plasma equipment can also be reduced, and enhanced durability/service life can be anticipated.

According to a fifth aspect, the gas processing apparatus of the third aspect is preferably configured such that a unit of plasma equipment positioned farthest upstream in the gas flow channel among the operating units of plasma equipment modifies the component having an aromatic six-member ring into an oxygen-containing organic compound.

When a component having an aromatic six-member ring is processed once by plasma that is expanded by electromagnetic waves, the six-member ring can be broken and the component modified into an oxygen-containing organic compound with extremely high efficiency. When the oxygen-containing organic compound is then processed once by the plasma, the oxygen-containing organic compound can be degraded at a high degradation rate. A compound having an aromatic six-member ring can thus be degraded at a high degradation rate by two or more stages of processing.

According to a sixth aspect, the gas processing apparatus of the first through third aspects is preferably configured such that three or more units of plasma equipment in the plasma equipment series are activated when gas containing a dioxin is conducted through the flow channel.

In the first stage of processing, the bonds between aromatic six-member rings of the dioxin species are broken. In the second stage of processing, the aromatic six-member rings are broken and modified into an oxygen-containing compound. The oxygen-containing organic compound is then degraded in the third stage of processing. Dehalogenation is performed in any of these three stages of processing. By dividing the processing into three or more stages, large quantities can be rapidly processed by a combination of relatively small-scale units of plasma equipment. The load on each unit of plasma equipment can also be reduced, and enhanced durability/service life can be anticipated.

According to a seventh aspect, the gas processing apparatus of the first through sixth aspects is preferably configured to further comprise a cavity for surrounding at least one reaction chamber and preventing electromagnetic waves from escaping; wherein a gas flow channel between a space inside the cavity and a space outside the cavity is communicated via at least one flow channel having an open sectional area determined based on the wavelength of the electromagnetic waves.

According to an eighth aspect, the gas processing apparatus of the first through sixth aspects is preferably configured to further comprise: a cavity for surrounding the reaction chamber; wherein the cavity comprises a wire mesh, prevents the escape of electromagnetic waves radiated by the electromagnetic wave radiator, and forms a resonance cavity for the electromagnetic waves.

According to a ninth aspect, the gas processing apparatus of the first through eighth aspects is preferably configured such that the controller selects the radiation time for the electromagnetic waves radiated by the electromagnetic wave radiator according to a component of the introduced gas.

The period of time for which electromagnetic waves are radiated is the period during which the irradiated plasma receives energy, and the period during which the plasma is expanded and heated. Selecting the radiation time of electromagnetic waves according to a component of the gas makes it possible to prepare plasma that is adapted for the degradation processing of the component to be processed. Versatility is consequently enhanced.

According to a tenth aspect, the gas processing apparatus of the first through eighth aspects is preferably configured such that the controller uniquely determines the radiation time for the electromagnetic waves radiated by the electromagnetic wave radiator according to a component of the introduced gas in accordance with a predetermined function.

According to an eleventh aspect, the gas processing apparatus of the first through tenth aspects is preferably configured to further comprise: a humidity adjuster adjusting the moisture content in a gas flow channel further upstream than the plasma equipment.

According to a twelfth aspect, the gas processing apparatus of the first through ninth aspects is preferably configured to further comprise: a moisture addition portion for introducing moisture into a gas flow channel further upstream than the unit of plasma equipment that has the electromagnetic wave radiator when the controller selects a time of 1 microsecond or less for the radiation time of electromagnetic waves by the electromagnetic wave radiator.

When the electromagnetic wave radiation time is 1 microsecond or less, there is less probability that OH radicals generated in large quantities in the thermal non-equilibrium state at the start of expansion of the plasma using electromagnetic waves will be inactivated by heat. In such operation, when a large quantity of moisture is included in the gas as the starting material for the plasma, OH radicals can be generated in correspondingly large quantities and utilized. Degradation by an oxidation reaction using OH radicals can therefore be facilitated.

According to a thirteenth aspect, the gas processing apparatus of the first through twelfth aspects is preferably configured such that the reaction chamber is communicated with the gas flow channel via a bundled plurality of pipes made of an electrical conductor.

A structure in which a plurality of bundled conductive pipes is used makes it possible to prevent the escape of electromagnetic waves while maintaining a high open area ratio. A large quantity of gas can therefore be easily introduced into the region in which plasma is generated. Noise reduction effects can also be anticipated.

According to a fourteenth aspect, the gas processing apparatus of the first through thirteenth aspects is preferably configured to further comprise: an air curtain forming portion forming an air curtain for surrounding the periphery of the region in which gas is present and extending to the region in which plasma is generated by the plasma equipment.

The air curtain makes it possible to direct the gas to the plasma and enhance the efficiency of gas processing.

According to a fifteenth aspect, the gas processing apparatus of the first through fourteenth aspects is preferably configured such that the number of units of plasma equipment activated is increased when the quantity of the component reaches a predetermined reference quantity.

When there is a large quantity of the component to be processed flowing through the flow channel, increasing the number of units of operating plasma equipment enables a large quantity of gas to be processed without excessively increasing the scale of the plasma formed by each unit of plasma equipment.

According to a sixteenth aspect, the gas processing apparatus of the fifteenth aspect is preferably configured such that a decision as to whether the quantity of the component has reached the reference quantity is made based on the flow rate of the gas.

The number of operating units of plasma equipment is increased to respond to increases in the absolute quantity of the component to be processed in the gas that accompany changes in the flow rate.

According to a seventeenth aspect, the gas processing apparatus of the fifteenth aspect is preferably configured such that a decision as to whether the quantity of the component has reached the reference quantity is made based on the concentration of the gas.

The number of operating units of plasma equipment is increased to respond to increases in the relative quantity of the component to be processed in the gas that accompany changes in the concentration.

According to an eighteenth aspect, the gas processing apparatus of the first through thirteenth aspects is preferably configured such that when two or more units of plasma equipment are activated, the timing at which each unit of plasma equipment is activated is determined based on the difference in the time at which the gas reaches each unit of plasma equipment.

In the timing of activating each unit of plasma equipment when the plurality of units of plasma equipment is activated, when the activation timing of each unit of plasma equipment in which the gas is processed is determined based on the difference in the time at which the gas reaches each unit of plasma equipment, it is possible to specify a number of times to process the gas in the plasma equipment as the gas passes through the gas processing apparatus.

According to a nineteenth aspect, the gas processing apparatus of the first through eighteenth aspects is preferably configured such that a multiphase flow in which solid or liquid particles are mixed occurs in the gas; and the controller selects, according to the particles, the number of units of plasma equipment activated.

According to a twentieth aspect, the gas processing apparatus of the first through nineteenth aspects is preferably configured such that the gas flow channel is divided into another flow channel in between the plasma generators.

According to a twenty-first aspect, the gas processing apparatus of the first through nineteenth aspects is preferably configured such that the gas flow channel is merged with another flow channel in between the plasma generators.

According to a twenty-second aspect, the gas processing apparatus of the twentieth or twenty-first aspects is preferably configured such that a plurality of the gas processing apparatuses are present, and the gas processing apparatuses are interconnected by the other flow channel.

According to a twenty-third aspect, the gas processing apparatus of the first through twenty-second aspects is preferably configured such that the controller determines at least one of the frequency distribution and phase of the electromagnetic waves in the plasma equipment; the position, direction, and number of radiation sources of the electromagnetic waves; and the disturbance, time fluctuation, and spatial distribution of the strength of the electric field generated by the electromagnetic waves according to the path by which the gas reaches the plasma equipment.

According to a twenty-fourth aspect, the gas processing apparatus of the first through twenty-second aspects is preferably configured such that a gas adjuster adjusting a characteristic of the gas is provided upstream from the gas flow channel.

According to a twenty-fifth aspect, the gas processing apparatus of the first through nineteenth aspects is preferably configured such that the plasma equipment performs self cleaning of the inside of the reaction chamber by being activated.

According to a twenty-sixth aspect, the gas processing apparatus of the first through twenty-fifth aspects is preferably configured such that the controller selects the frequency distribution and phase of the electromagnetic waves; the position, direction, and number of radiation sources of the electromagnetic waves; and the disturbance, time fluctuation, and spatial distribution of the strength of the electric field generated by the electromagnetic waves on the basis of at least one of the average, total, maximum value, minimum value, dispersion, disturbance, time fluctuation, spatial distribution, variance, and pattern relating to at least one of the quantity of flow, flow rate, concentration, mixture ratio of components, pressure, and temperature of the introduced gas.

According to a twenty-seventh aspect, the gas processing apparatus of the first through twenty-sixth aspects is preferably configured for in-plant use.

According to a twenty-eighth aspect, the gas processing apparatus of the first through twenty-sixth aspects is preferably configured for end-of-pipe use.

According to a twenty-ninth aspect, a gas processing system comprises: a plurality of the gas processing apparatuses according to any of aspects 1 through 28; wherein units of the plasma equipment are arranged in a matrix or staggered lattice on the gas flow channel.

Arranging the gas processing apparatus in a matrix or a staggered lattice makes it possible to increase the quantity of gas processed while maintaining the processing speed.

According to a thirtieth aspect, a gas processing method using plasma; the gas processing method comprising: a first step of using a unit of plasma equipment having a plasma generator and an electromagnetic wave radiator for radiating electromagnetic waves to plasma generated by the plasma generator to break the bond of a carbon compound having at least one carbon-to-carbon bond and cause oxygen to bond where the carbon-to-carbon bond was broken; and a second step of using a unit of plasma equipment having a plasma generator and an electromagnetic wave radiator for radiating electromagnetic waves to plasma generated by the plasma generator to break a carbon-to-carbon bond of an oxygen-containing organic compound among the components generated in the first step and cause oxygen to bond where the carbon-to-carbon bond was broken.

An aromatic six-member ring is first broken and modified into an oxygen-containing compound in the first step. In the second step, the oxygen-containing organic compound can be degraded at a high degradation rate. A compound having an aromatic six-member ring can be degraded at a high degradation rate. Large quantities of gas can be rapidly processed using small-scale units of plasma equipment. The load on each unit of plasma equipment can also be reduced, and enhanced durability/service life can be anticipated.

According to a thirty-first aspect, in an exhaust gas processing system for an internal combustion engine; the exhaust gas processing system is characterized in that units of the plasma equipment of the gas processing apparatus according to any of aspects 1 through 28 are provided within the gas flow channel of a section from within a combustion chamber of the internal combustion engine to the terminal end of an exhaust pipe, and the controller activates the units of plasma equipment when gas that has undergone a combustion process passes through a unit of plasma equipment selected by the control device.

According to a thirty-second aspect of the present invention, an internal combustion engine is characterized in that a combustion chamber comprising a plurality of secondary combustion chambers communicated in series via a gas flow channel is formed in the vicinity of the compression top dead center; and the plasma equipment of the gas processing apparatus according to any of aspects 1 through 28 is positioned in the secondary combustion chambers.

According to the first aspect, expanding the plasma and performing plasma processing a number of times according to the component enables a large quantity of gas to be processed in one pass.

According to the third aspect, by plasma expanded by electromagnetic waves, a carbon compound having a carbon number of 2 or higher can be modified into a so-called oxygen-containing compound that includes oxygen in the molecule thereof.

According to the fourth aspect, by dividing processing into two or more stages, large quantities can be rapidly processed by a combination of relatively small-scale units of plasma equipment. The load on each unit of plasma equipment can also be reduced, and enhanced durability/service life can be anticipated.

According to the fifth aspect, a compound having an aromatic six-member ring can be degraded at a high degradation rate by two stages of processing that include breaking the six-member ring and modifying into an oxygen-containing compound, and degrading the oxygen-containing organic compound.

According to the sixth aspect, by dividing the processing into three or more stages, large quantities of dioxin species can be rapidly processed by a combination of relatively small-scale units of plasma equipment. The load on each unit of plasma equipment can also be reduced, and enhanced durability/service life can be anticipated.

According to the eighth aspect, the cavity is composed of a wire mesh, the electromagnetic waves radiated by the electromagnetic wave radiator can be prevented from escaping, a resonance space for electromagnetic waves can be formed, and the efficiency of gas processing by plasma can be enhanced.

According to the ninth aspect, plasma can be prepared that is adapted for the degradation processing of the component to be processed, and versatility is enhanced.

According to the twelfth aspect, degradation by an oxidation reaction using OH radicals can be facilitated.

According to the thirteenth aspect, the escape of electromagnetic waves can be prevented while maintaining a high open area ratio, and a large quantity of gas can be easily introduced into the region in which plasma is generated. Noise reduction effects can also be anticipated.

According to the fourteenth aspect, the air curtain makes it possible to direct the gas to the plasma and enhance the efficiency of gas processing.

According to the fifteenth through seventeenth aspects, when there is a large quantity of the component to be processed flowing through the flow channel, increasing the number of units of operating plasma equipment enables a large quantity of gas to be processed without excessively increasing the scale of the plasma formed by each unit of plasma equipment.

According to the eighteenth aspect, it is possible to specify a number of times to process the gas in the plasma equipment as the gas passes through the gas processing apparatus. Since the gas processing apparatus is connected in series, plasma processing can be performed the appropriate number of times by a single passage through the gas processing apparatus.

According to the nineteenth aspect, gas in a multiphase flow can be processed.

According to the twentieth or seventeenth aspect, variation of the gas processing is increased and versatility is increased by division or convergence.

According to the twenty-first aspect, by performing self-cleaning, internal cleanliness can be maintained, retention of gas can be prevented, and maintenance properties can be improved.

According to the twenty-fifth aspect, gas processing can be performed in a manner in which the frequency distribution and phase of the electromagnetic waves; the position, direction, and number of radiation sources of the electromagnetic waves; and the disturbance, time fluctuation, and spatial distribution of the strength of the electric field generated by the electromagnetic waves are selected on the basis of at least one of the average, total, maximum value, minimum value, dispersion, disturbance, time fluctuation, spatial distribution, variance, and pattern relating to at least one of the quantity of flow, flow rate, concentration, mixture ratio of components, pressure, and temperature of the introduced gas.

According to the twenty-sixth aspect, the operational effects of any of the first through nineteenth aspects can be demonstrated in-plant.

According to the twenty-seventh aspect, the operational effects of any of the first through nineteenth aspects can be demonstrated end-of-pipe.

According to the twenty-eighth aspect, arranging the gas processing apparatus in a matrix or a staggered lattice makes it possible to increase the quantity of gas processed while maintaining the processing speed.

According to the twenty-ninth aspect, a compound having an aromatic six-member ring can be degraded at a high degradation rate. Large quantities of gas can be rapidly processed using small-scale units of plasma equipment. The load on each unit of plasma equipment can also be reduced, and enhanced durability/service life can be anticipated.

Specifically, the present invention makes it possible to provide a gas processing apparatus for processing a gas using plasma, wherein the gas processing apparatus is highly versatile and capable of rapidly processing a large quantity of gas that includes particularly an aromatic compound or other component that is difficult to process.

DETAILED DESCRIPTION OF THE INVENTION

Preferred embodiments will be described with reference to the accompanying drawings.

(Overview of Gas Processing Apparatus)

The gas processing apparatus is a gas processing apparatus for using plasma, plasma heat, and/or highly oxidative reactive components formed from plasma to oxidize aromatic organic compounds, aldehydes, and various other organic compounds in gas to ultimately form carbon dioxide and water. The phrase "highly oxidative reactive components" refers specifically to OH radicals, ozone, and other components generated by processing oxygen or water using plasma in a thermal non-equilibrium state.

In the present embodiment, the plasma used in gas processing is generally formed by the following two steps. Specifically, generation of the plasma used in processing is initiated by first generating a small-scale plasma by a spark discharge. Energy is then imparted to charged particles in the plasma by irradiating the generated plasma with microwave pulses to assist expansion of the plasma. At this time, the duration of the microwave pulses is adjusted and the number of processing cycles using the plasma is adjusted according to the component in the gas, the concentration, and other factors of the gas to be processed.

In the adjustment of the microwave pulses, by adjusting the duration of the microwave pulses, for example, the selective generation of thermal non-equilibrium plasma and thermal equilibrium plasma, or the temperature condition of the plasma is controlled. The amount processed is also adjusted by adjusting the number of times the microwave pulses are radiated per unit time, for example.

In the adjustment of the number of processing cycles, processing for modifying gas using plasma is executed over two cycles of processing for components such as aromatic compounds, for example, which are generally considered to be difficult to degrade. Specifically, in the first processing cycle, the six-member ring is broken, and the aromatic compound is modified into an oxygen-containing organic compound. In the second processing cycle, the oxygen-containing organic compound is degraded and modified into carbon dioxide and water. This processing may be performed in-plant or end-of-pipe.

Figure 1:
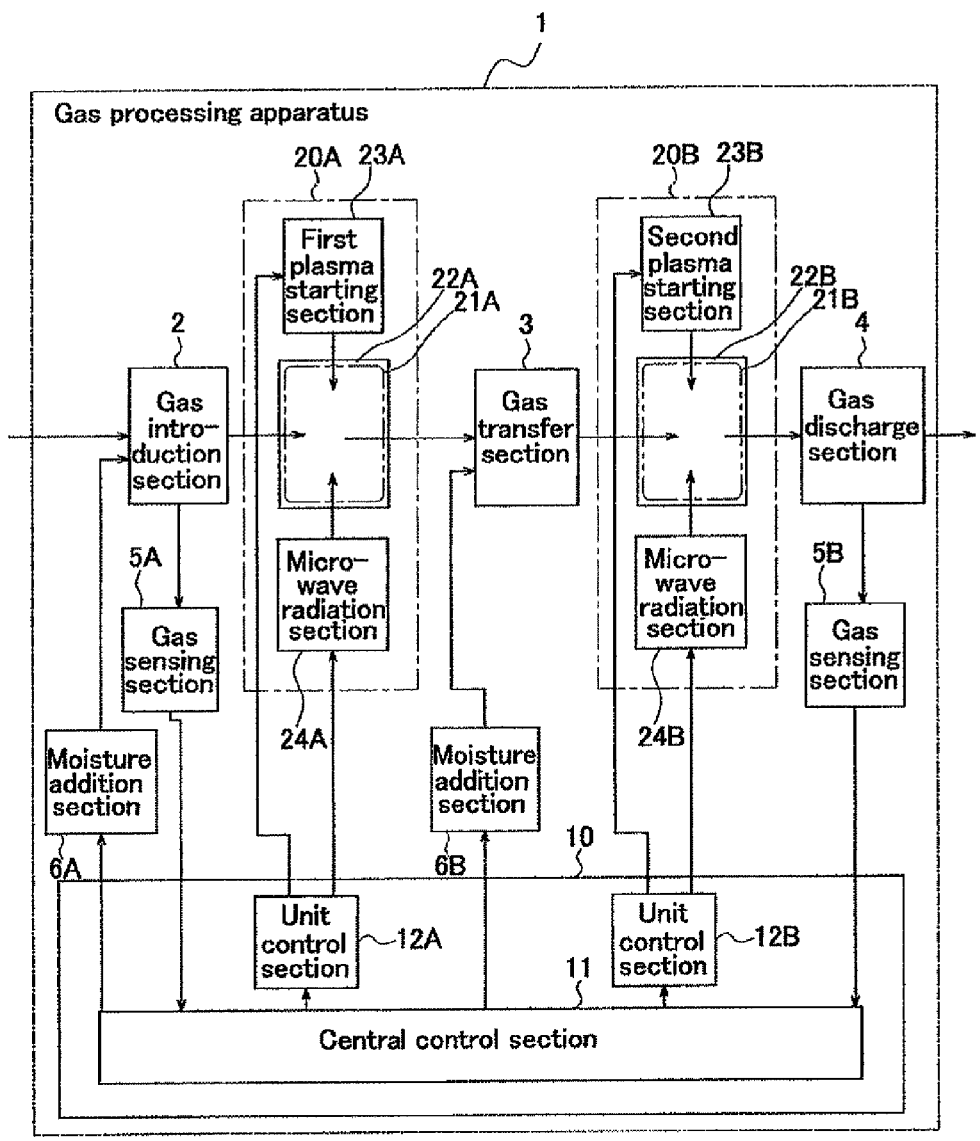
FIG. 1 is a block view showing the functional structure of the gas processing apparatus according to the first embodiment.

FIG. 1 is a block view showing the functional structure of the gas processing apparatus 1 according to the present embodiment.

As shown in FIG. 1, the gas processing apparatus 1 is composed of a first gas processing unit 20A and a second gas processing unit 20B, each of which uses plasma to modify the introduced gas.

The gas processing apparatus has a gas introduction section 2 for introducing gas into the first gas processing unit 20A; a gas transfer section 3 for transferring the gas processed by the first gas processing unit 20A to the second gas processing unit 20B; a gas discharge section 4 for discharging the gas processed by the second gas processing unit 20B; a first gas sensing section 5A for measuring the gas that passes through the gas introduction section 2; a second gas sensing section 5B for measuring the gas that passes through the gas discharge section 4; a first moisture addition section 6A for feeding moisture to the gas that flows via the gas introduction section 2; and a second moisture addition section 6B for feeding moisture to the gas that flows via the gas transfer section 3.

The gas processing apparatus also has a control section 10 for outputting an instruction signal corresponding to input from the first gas sensing section 5A and second gas sensing section 5B to the first gas processing unit 20A, the second gas processing unit 20B, and the moisture addition sections 6A and 6B.

The control section 10 presents a total of six systems of instruction signals, two systems each to the first gas processing unit 20A and second gas processing unit 20B, and one system each to the moisture addition sections 6A and 6B.

The control section 10 has a central control section 11 connected to the gas sensing sections 5A and 5B, and to the moisture addition sections 6A and 6B; a first unit control section 12A connected to the central control section 11 and to a plasma starting section 23A and microwave radiation section 24A of the first gas processing unit 20A; and a second unit control section 12B connected to the central control section 11 and to a plasma starting section 23B and microwave radiation section 24B of the second gas processing unit 20B.

The central control section 11 determines the number of gas processing units to be activated, the specifications of the plasma to be generated in the gas processing units, and whether there is a need to add moisture on the basis of the input from the gas sensing sections 5A and 5B. The unit control section 12A and unit control section 12B determine the timing of the operation of the plasma starting sections 23A and 23B, and the microwave radiation sections 24A and 24B so that plasma of the specifications determined by the central control section 11 is generated. These determinations are issued and received as instruction signals in a predetermined format.

The first gas processing unit 20A has a cavity 22A communicated with the gas introduction section 2 and the gas transfer section 3 and surrounding a predetermined space 21A; the plasma starting section 23A for operating in accordance with one of the two systems of instruction signals issued by the gas processing unit 20 and forming a state (hereinafter referred to as the "initial state") in which the plasma used in processing has an opportunity to form; and the microwave radiation section 24A for operating in accordance with the other of the two systems of instruction signals from the control section 10 and performing microwave oscillation and radiation.

The second gas processing unit 20B has a cavity 22B communicated with the gas transfer section 3 and the gas discharge section 4 and surrounding a predetermined space 21B; and the plasma starting section 23B and microwave radiation section 24B the same as the plasma starting section 23A and microwave radiation section 24A of the first gas processing unit 20A.

The gas to be processed is introduced into the spaces 21A and 21B inside the cavities 22A and 22B, the plasma initial state is formed, and microwaves are radiated into the spaces. Specifically, the plasma used in gas processing is formed in the spaces and used to process the gas. The cavity 22A is provided with the ability to confine the plasma and microwaves within the space 21A. The spaces 21A and 21B are referred to as "processing chambers" in the description hereinafter.

In the description given below, the instruction signal presented by the central control section 11 to the first unit control section 12A or second unit control section 12B is referred to as a "unit instruction signal," and the instruction signal presented by the central control section 11 to the moisture addition section 6A or 6B is referred to as a "moisture addition signal." The instruction signal presented by the unit control section 12A or 12B to the plasma starting section 23A or 23B is referred to as a "starting signal," and the instruction signal presented by the unit control section 12A or 12B to the microwave radiation section 24A or 24B is referred to as an "assist signal."

(Detailed Structure of Each Functional Section)

The gas introduction section 2, the gas transfer section 3, and the gas discharge section 4 are specifically composed of ducts forming the gas flow channel, and fans and the like provided to the ducts. The flow of gas is formed by the difference in pressure between the upstream and downstream sides of the gas flow channel, and gas is thereby introduced to and discharged from the cavities 22A and 22B. The fans or the like may be provided to the upstream side or the downstream side insofar as the fans or the like are arranged so as to create a flow of gas in a continuous flow channel. The gas introduction section 2, the gas transfer section 3, and the gas discharge section 4 are not necessarily each provided with a fan or the like. For example, there is no need for a fan or the like insofar as the gas is introduced into the gas processing apparatus 1 at an already sufficient flow rate.

Figure 2:
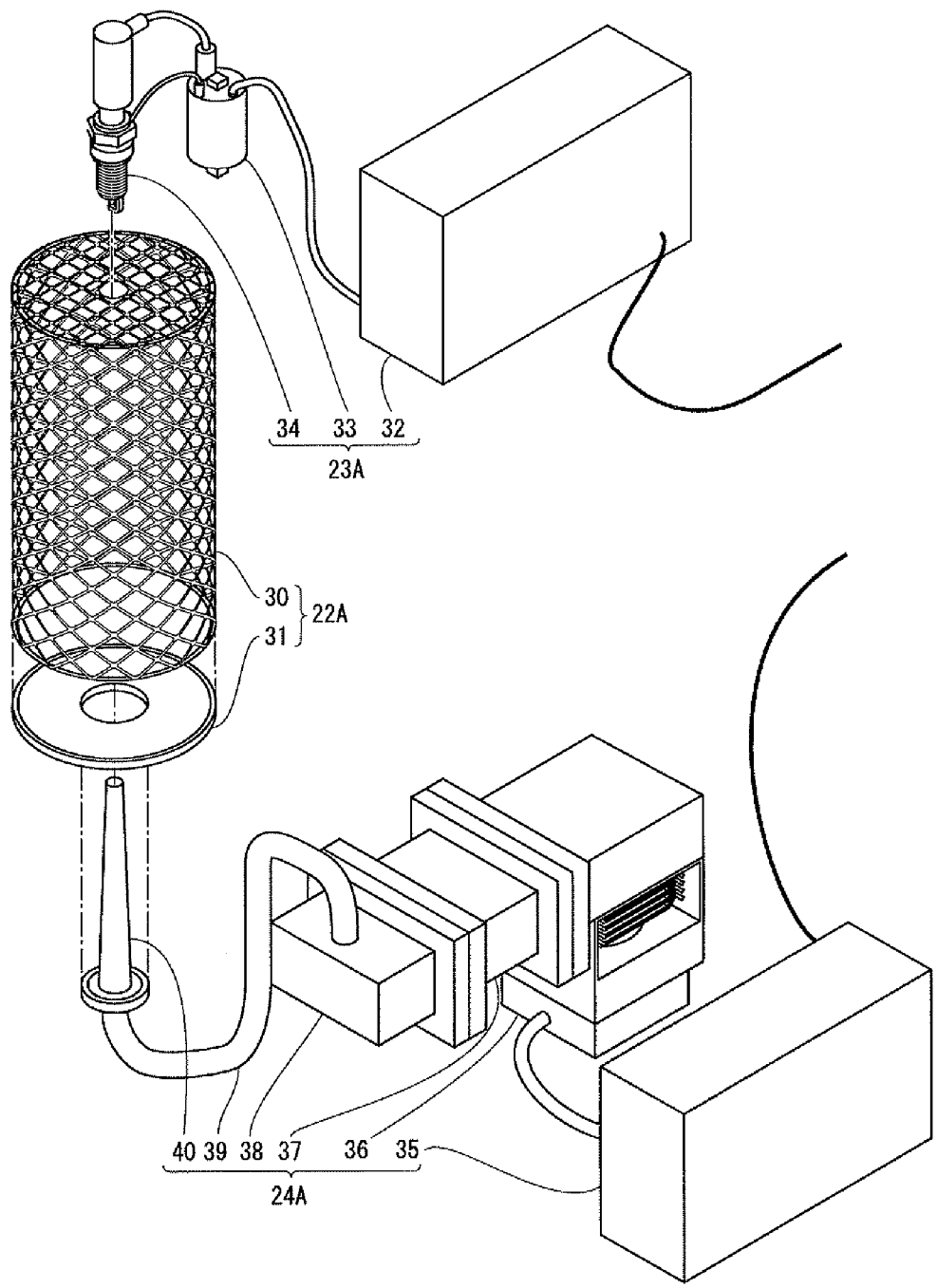
FIG. 2 is a perspective view showing the hardware configuration of the gas processing unit.

FIG. 2 shows the hardware structure of the gas processing unit 20A.

As shown in FIG. 2, the cavity 22A of the gas processing unit 20A has a cylindrical wire mesh 30 open at one end and provided with an opening at the other end, and a conductive lid 31 joined to the open end of the wire mesh 30. The plasma starting section 23A is joined to the opening portion of the wire mesh 30. An opening is provided to the lid 31, and the microwave radiation section 24A is joined to the opening. The space enclosed by the wire mesh 30 and the lid 31 constitutes a processing chamber 21A.

The plasma starting section 23A has a spark plug ignition signal generator 32 connected so as to receive a starting signal from the control section 10; an ignition coil 33 connected to the ignition signal generator 32; and a spark plug 34 connected to the ignition coil 33. The spark plug 34 is joined to the wire mesh 30 in a state in which the electrode portion thereof is inserted through the opening of the wire mesh 30 so that the electrode portion is positioned inside the processing chamber 21A.

The microwave radiation section 24A has a direct-current pulse power supply device 35 connected so as to receive an assist signal from the control section 10; a magnetron 36 connected to the direct-current pulse power supply device 35; a microwave transmission path composed of a waveguide 37, a coaxial waveguide converter 38, and a coaxial cable 39; and an antenna 40 connected to the coaxial cable 39. The direct-current pulse power supply device 35 may be specifically an inverter power supply device. The antenna 40 is inserted through the opening of the lid 31 so that the emission end thereof is inside the processing chamber 21A. The shape of the antenna 40 is selected as appropriate according to the oscillation frequency of the magnetron 36 and the characteristics of the cavity 22A. The magnetron 36 may be of the 2.45 GHz variety used in a household microwave oven or the like.

The shape of the cavity 22A is preferably selected so that a spatial resonance space corresponding to the oscillation frequency of the magnetron 36 is formed. The microwaves resonate inside the processing chamber 21A and produce a standing wave. The spark plug 34 is preferably joined to the wire mesh 30 so that the electrode portion is positioned at the center of the standing wave.

The second gas processing unit 20B is configured in the same manner as the gas processing unit 20A.

Figure 3:
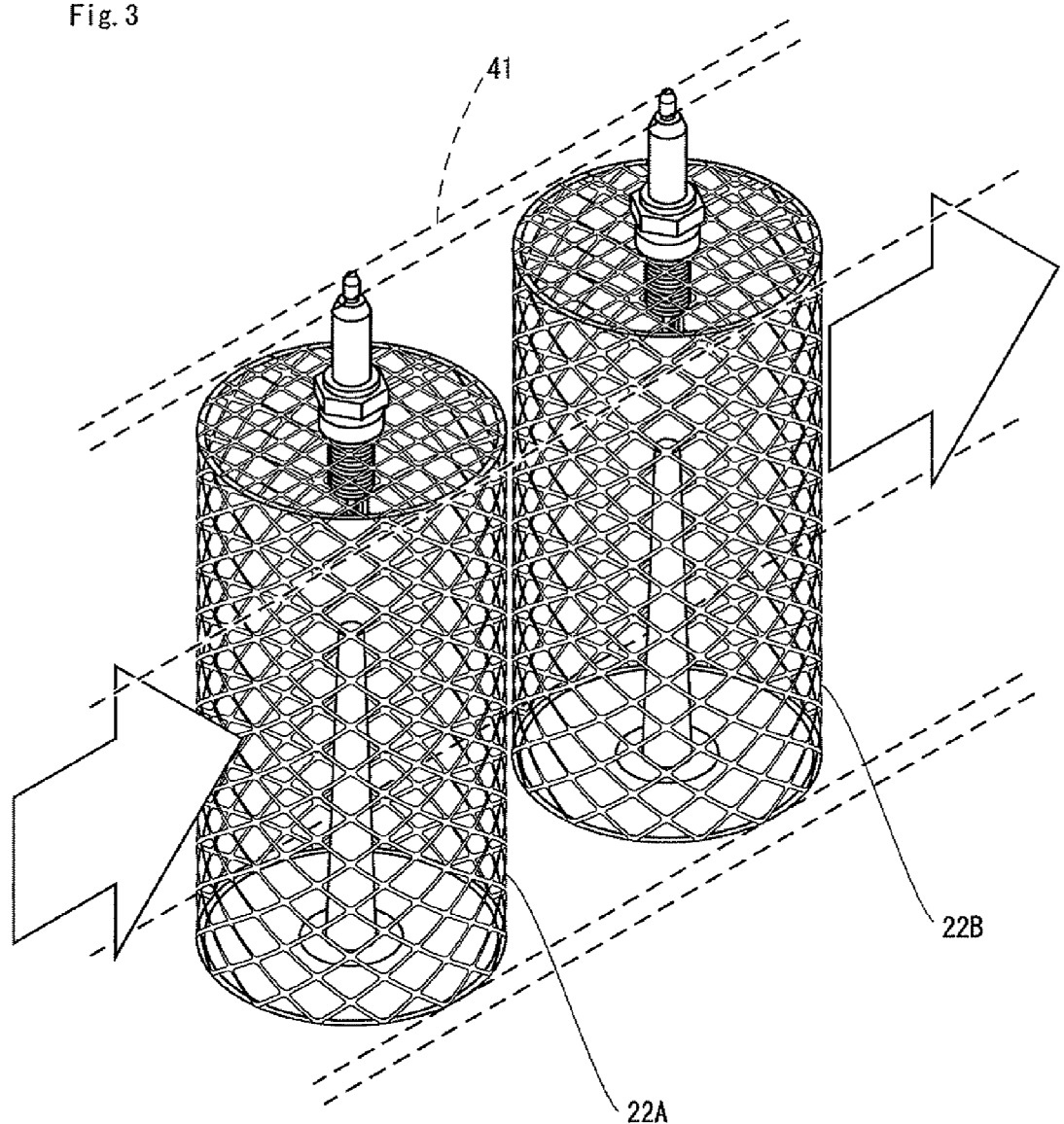
FIG. 3 is a perspective view showing the arrangement of cavities in the duct.

FIG. 3 shows an example of the arrangement of the cavities 22A and 22B in a duct.

In this example, the cavities 22A and 22B are arranged in sequence in a duct 41, as shown in FIG. 3. Since the sides of the cavities 22A and 22B are made of wire mesh, gas that arrives from upstream in the duct 41 passes through both of the reaction chambers 21A and 21B.

Figure 4:
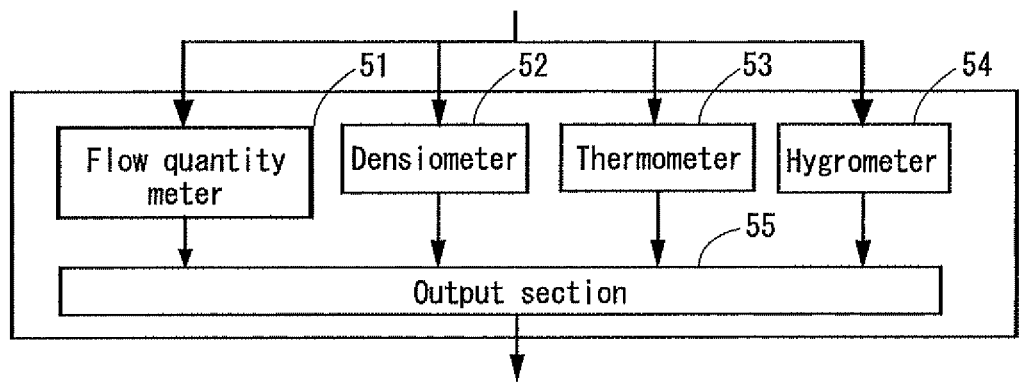
FIG. 4 is a block view showing the overall structure of the gas sensing section.

FIG. 4 shows the functional configuration of the first gas sensing section 5A.

As shown in FIG. 4, the first gas sensing section 5A has a flow quantity meter 51, densitometer 52 for each component, thermometer 53, and hygrometer 54 that are connected to the gas introduction section 2; and an output section 55 for outputting to the control section 10 the outputs of the flow quantity meter 51, densitometer 52, thermometer 53, and hygrometer 54. The densitometer 52 outputs signals corresponding to the concentration of an aromatic hydrocarbon compound (benzene, toluene, xylene, or the like) and the concentration of an oxygen-containing organic compound (aldehyde, alcohol, carboxylic acid, ether, ketone, or the like), for example. In the description hereinafter, the densitometer 52 outputs signals corresponding to at least the concentration of an aromatic hydrocarbon compound, the concentration of an oxygen-containing organic compound, and the concentration of an aliphatic hydrocarbon.

Except for being connected to the gas discharge section 4, the second gas sensing section 5B has the same configuration and function as the first gas sensing section 5A.

Figure 5:
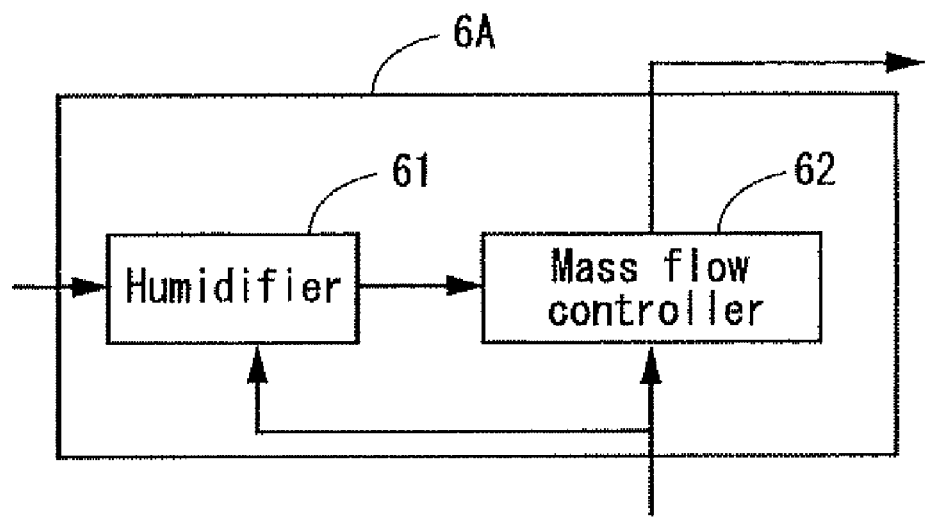
FIG. 5 is a block view showing the overall structure of the moisture addition section.

FIG. 5 shows the overall structure of the moisture addition section 6A.

As shown in FIG. 5, the moisture addition section 6A has a humidifier 61 and a mass flow controller 62. A moisture addition signal is presented to both of these components. The humidifier 61 activates in response to the moisture addition signal, and the mass flow controller 62 discharges, at a flow quantity in accordance with the moisture addition signal, air that is humidified by the humidifier 61. The humidifier 61 may be a nebulizer, for example, or a heating-type humidifier.

The control section 10 is essentially executed by a common computer; i.e., computer hardware, a program executed by computer hardware, and data stored by computer hardware. The program for operating the computer as the control section 10 is stored in removable media, a hard disk, ROM (read only memory), or other storage device and loaded into RAM (random access memory) at the time of execution. The program may also be transmitted to a computer via a network or the like. The program includes a plurality of commands for causing the computer to operate the control section 10. The several basic functions needed for these operational commands are installed in advance in the computer and provided by an operating system (OS), a third-party program, or various toolkit modules operated on the computer. Consequently, the program need not include all the functions necessary for the control section 10, and need only include the functions appropriate to the method controlled so as to obtain the desired results, and the commands for executing the operation of the control section 10 by invoking tools and the like. The operation of the computer is publicly known, and therefore will not be described.

Figure 6:
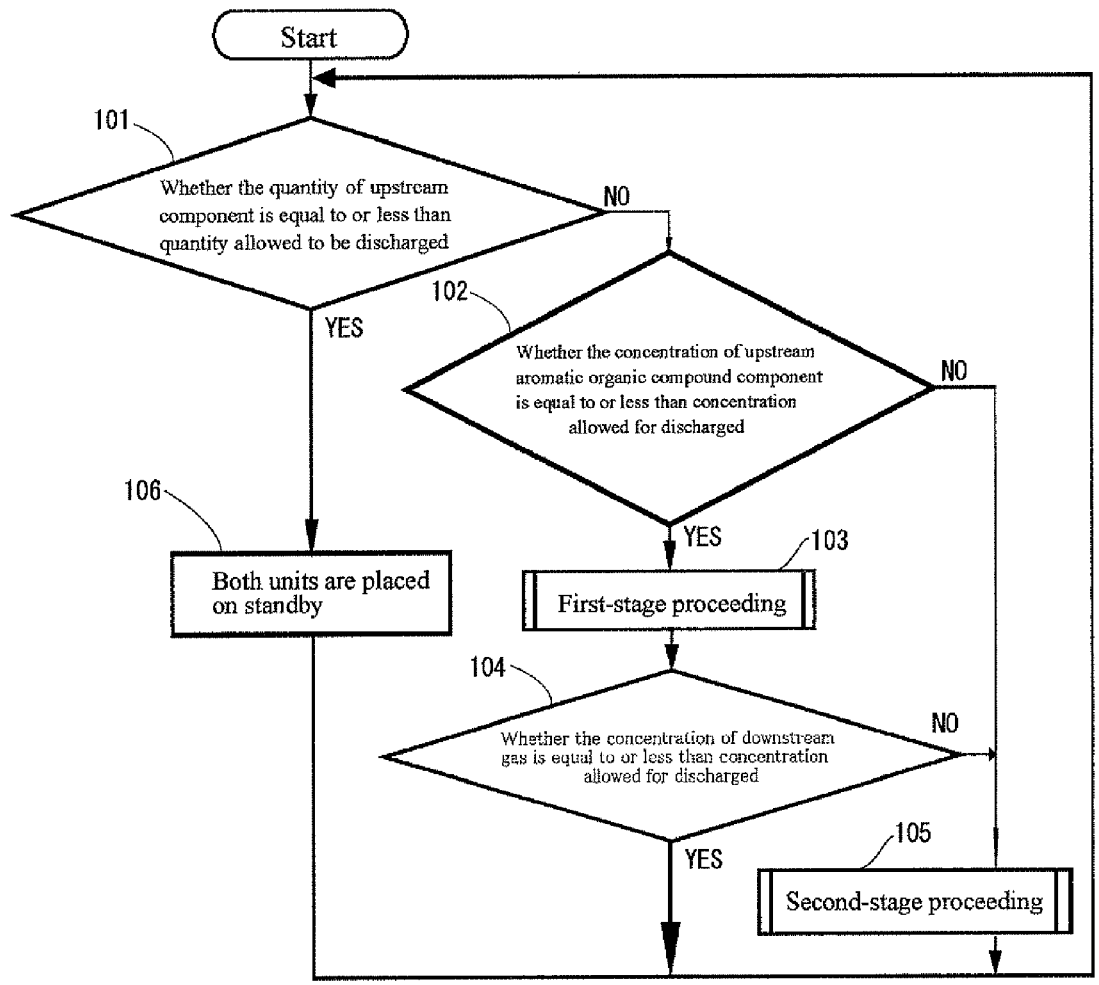
FIG. 6 is a flowchart showing the structure of control performed by the central control section.

FIG. 6 shows an example of the structure of control by the central control section 11.

When the central control section 11 initiates control, in step 101 as shown in FIG. 6, a determination is made as to whether the quantity of the component to be processed in the gas upstream from the gas processing unit 20A is equal to or less than the quantity allowed to be discharged, on the basis of the flow quantity and concentration signals from the first gas sensing section 5A. When the result of the determination is YES, the process proceeds to step 106. Otherwise, the process proceeds to step 102. In step 106, the first gas processing unit 20A and the second gas processing unit 20B are both placed on standby, and the process returns to step 101.

In step 102, a determination is made as to whether the concentration of an aromatic organic compound upstream from the gas processing unit 20A is equal to or lower than the concentration allowed for discharge. When the result of the determination is YES, the process transitions to step 103. Otherwise, the process transitions to step 105.

In step 103, control is executed for first-stage processing using only the first gas processing unit 20A. In step 104, a determination is made as to whether the concentration of an organic compound in the gas downstream from the gas processing unit 20B is equal to or lower than a predetermined target concentration, on the basis of the signal from the second gas sensing section 5B. When the determination is YES, the process returns to step 101. Otherwise, the process transitions to step 105.

In step 105, control is executed for second-stage processing using both the first gas processing unit 20A and the second gas processing unit 20B, and the process returns to step 101.

Figure 7:
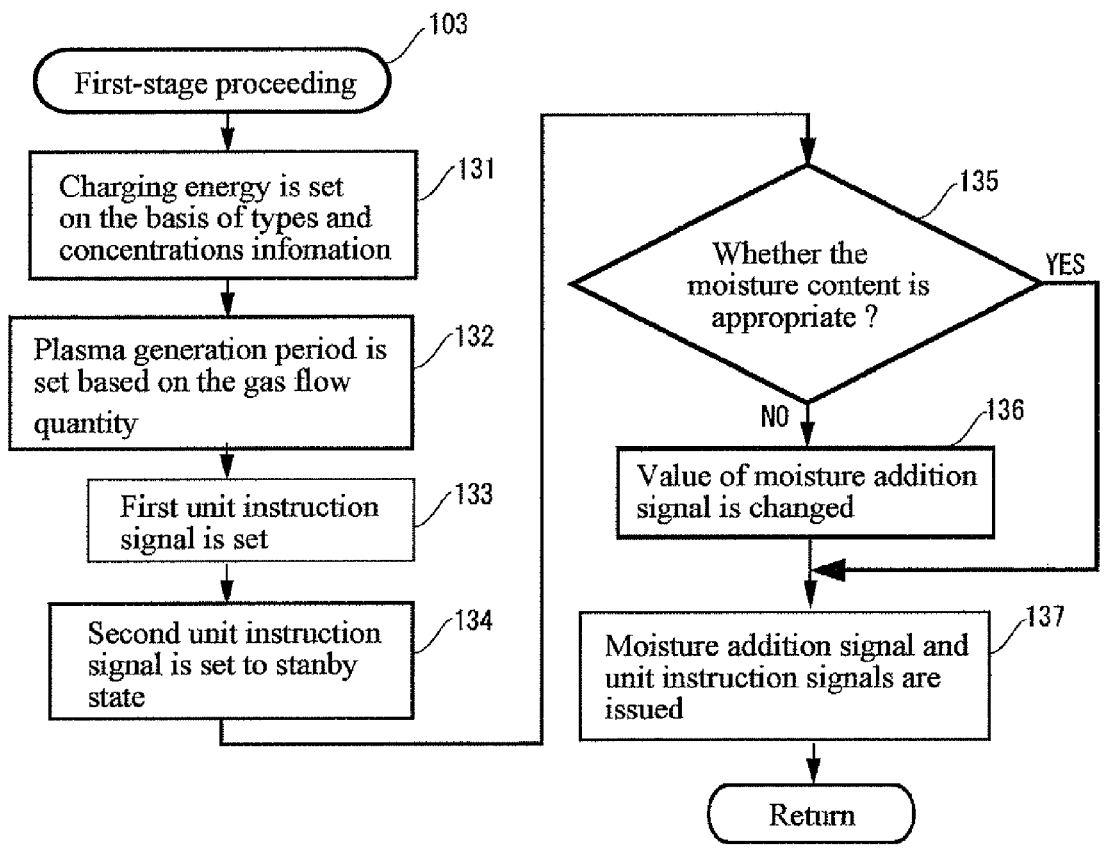
FIG. 7 is a flowchart showing the structure of control performed by the central control section during first-stage processing.

FIG. 7 shows the structure of control of the first-stage processing 103.

When the first-stage processing 103 is initiated, in step 131 as shown in FIG. 7, a signal from the second gas sensing section 5B is read, and the charging energy in the first gas processing unit 20A is set on the basis of items of information included in the signal that relate to the types and concentrations of chemical substances in the gas. In step 132, a plasma generation period is set based on the gas flow quantity included in the signal from the second gas sensing section 5B. A one-cycle plasma duration is set from the charging energy and the plasma generation period. In step 133, a first unit instruction signal is set by converting the results of processing by step 131 and step 132 into the format of an instruction signal. In step 134, a second unit instruction signal is set to a value corresponding to the standby state of the second gas processing unit 20B.

In step 135, a determination is made as to whether the moisture content of the gas is appropriate on the basis of items of information relating to temperature and humidity that are included in the signal from the first gas sensing section 5A. For example, the amount of water vapor is calculated from the temperature and humidity, and a determination is made as to whether the calculated value is at the saturation water vapor level for the measured temperature. When the saturation water vapor level has been reached, the process proceeds to step 137. Otherwise, the process proceeds to step 136.

In step 136, the quantity of moisture to be added to the gas is calculated based on the water vapor amount and the saturation water vapor amount, and the value of the moisture addition signal is changed to a value that corresponds to the quantity of moisture to be added. In step 137, the moisture addition signal, the first unit instruction signal, and the second unit instruction signal are issued to the corresponding functional sections.

Figure 8:
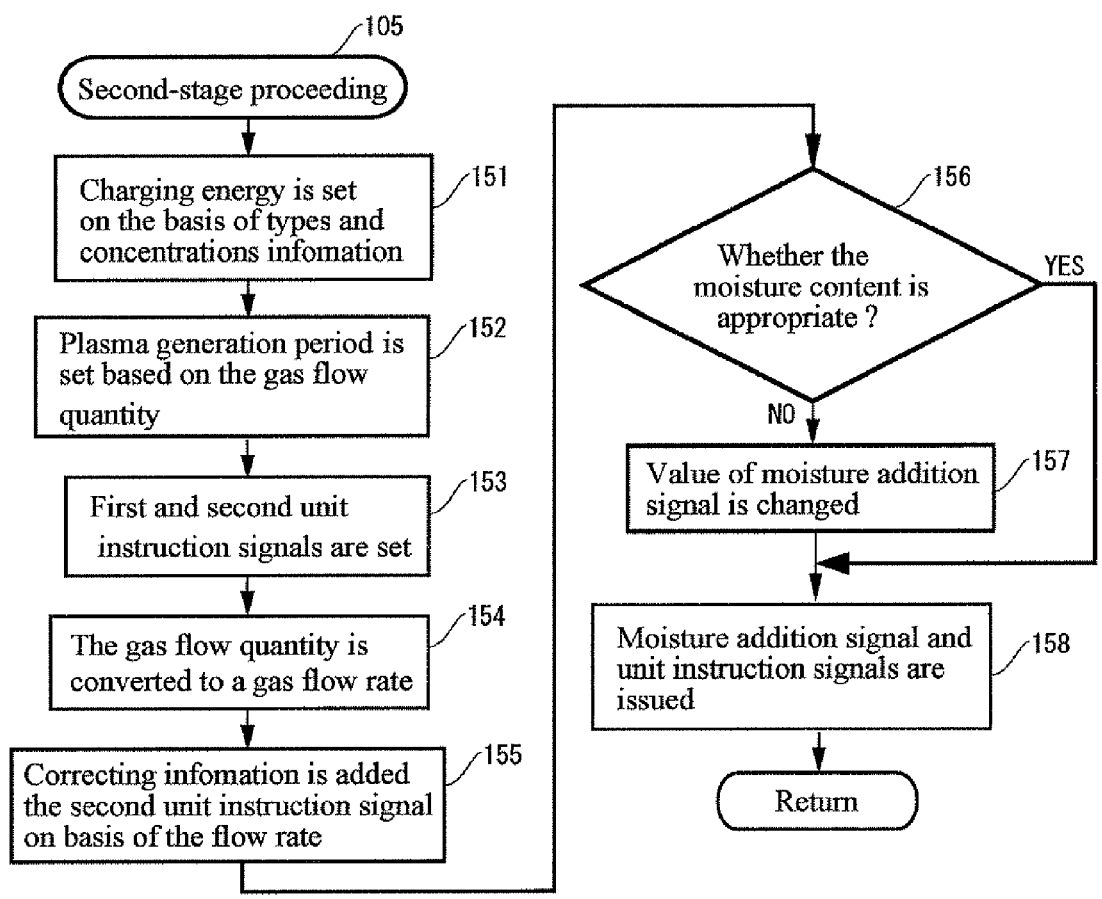
FIG. 8 is a flowchart showing the structure of control performed by the central control section during second-stage processing.

FIG. 8 shows the structure of control of the second-stage processing 105.

When the second-stage processing 105 is initiated, in step 151 as shown in FIG. 8, the charging energy is set on the basis of the types and concentrations of chemical substances in the gas by the same method as in step 131 of FIG. 7. However, in step 151, the gas is assumed to be processed twice by plasma, and the charging energy is set for both the first gas processing unit 20A and the second gas processing unit 20B. In step 152, the plasma generation period in the first gas processing unit 20A and the second gas processing unit 20B is set based on the gas flow quantity.

In step 153, the first unit instruction signal and second unit instruction signal are set by converting the results of processing by step 151 and step 152 into the format of instruction signals. In step 154, the gas flow quantity is converted to a gas flow rate on the basis of the signal from the gas sensing section 5A and/or 5B. In step 155, information relating to a correction value for the plasma start timing is added to the second unit instruction signal on the basis of the flow rate calculated in step 154. The same processing is executed in steps 156 and 157 as in steps 135 and 136 shown in FIG. 7, respectively. In step 158, the moisture addition signal, the first unit instruction signal, and the second unit instruction signal are issued to the corresponding functional sections.

Figure 9:
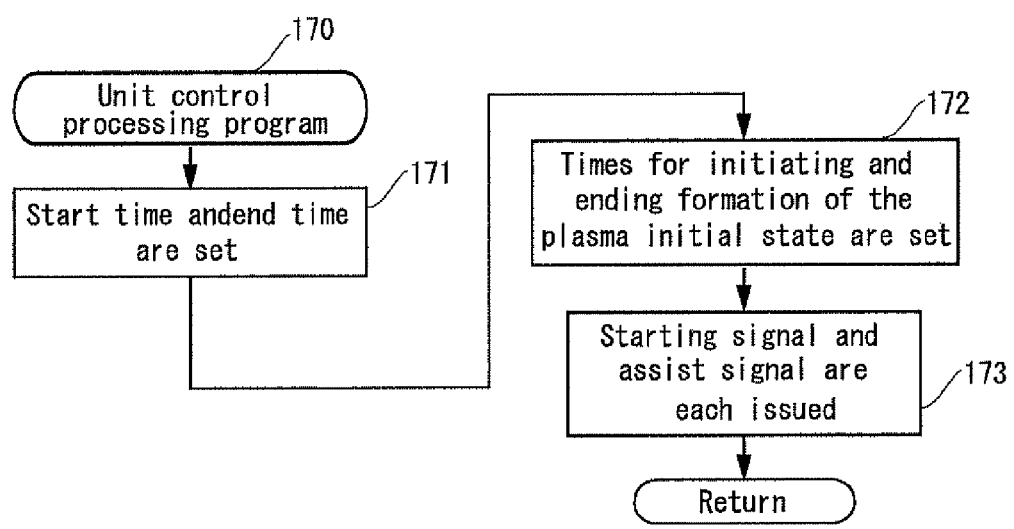
FIG. 9 is a flowchart showing the structure of control performed by the unit control sections.

FIG. 9 shows the structure of control by a unit control processing program 170 for implementing the functions of the unit control sections 12A and 12B.

When this program 170 is initiated, as shown in FIG. 9, the start time and end time of each pulse oscillation of microwaves are set, and the set values are converted to the format of assist signals in step 171 on the basis of a unit instruction signal. In step 172, the times for initiating and ending formation of the plasma initial state are set based on the start time and end time set in step 171, and the set values are converted to the format of starting signals. In step 173, the starting signal and assist signal are each issued to the corresponding functional sections.

The gas processing apparatus 1 according to the present embodiment configured as described above operates as described below. Specifically, when the gas arrives, the gas introduction section 2 introduces the gas into the processing chamber 21, as shown in FIG. 1. The introduced gas is transported to the subsequent stages in sequence by the gas transfer section 3 and the gas discharge section 4. At the same time, the first gas sensing section 5A measures the flow quantity, the concentration of each component, the temperature, and the humidity. The results of these measurements are presented to the central control section 11 in a predetermined signal format.

The central control section 11 selects one of the operations described in Operation Examples 1 through 3 below on the basis of the results of measurement by the first gas sensing section 5A. The gas processing apparatus 1 executes the operation that corresponds to the selection.

OPERATION EXAMPLE 1

When the concentration of a component to be processed in the gas passing through the gas introduction section 2 is equal to or lower than the allowed value, the central control section 11 selects an operation for placing both gas processing units 20A and 20B in standby. In accordance with this selection, the unit control sections 12A and 12B, the gas processing units 20A and 20B, and the moisture addition sections 6A and 6B pause operation. The gas introduced into the processing chamber 21A by the gas introduction section 2 is discharged from the processing chamber 21A via the gas transfer section 3, the processing chamber 21B, and the gas discharge section 4.

OPERATION EXAMPLE 2

When the concentration of an aromatic compound is below the allowed value, and the concentration of other components exceeds the allowed value, the first gas processing unit 20A is first activated, and then an operation is selected for determining whether to activate the second gas processing unit 20B, on the basis of the signal from the second gas sensing section 5B.

When this selection is made, the central control section 11 reads the output of the second gas sensing section 5B and specifies the charging energy in the first gas processing unit 20A and the plasma generation period.

The charging energy is specified so as to be higher the higher the concentration of the component to be processed is. The plasma generation period is specified so as to be shorter the larger the flow quantity of the gas to be processed is. The one-cycle plasma duration is also specified from the charging energy and the plasma generation period. This plasma duration is set to about 1 microsecond if there is a need to reduce the amount of nitrogen oxides generated. When processing is performed using the oxidizing effect of OH radicals in thermal non-equilibrium plasma, the plasma duration is set according to the thermal relaxation time of electrons and ions in the plasma. In this case, it is generally sufficient if the plasma duration is from several nanoseconds to several hundred nanoseconds at atmospheric pressure.

The central control section 11 presents information relating to the charging energy, the plasma generation period, and the plasma duration as unit instruction signals to the unit control section 12A. The unit control section 12A receiving the unit instruction signals determines the start time and end time of plasma generation on the basis of the charging energy, plasma generation period, and plasma duration. These times are then corrected based on the delay of signal transmission to the microwave radiation section 24A, the time required for rising and falling of the microwave radiation section 24A, and other factors, and the start time and end time of microwave oscillation are set. The unit control section 12A then sets the start time and end time of operation of the plasma starting section 23A so that the plasma starting section 23A generates a small-scale plasma at the start time for plasma generation. The unit control section 12A then outputs a starting signal and an assist signal so that the plasma starting section 23A and the microwave radiation section 24A operate at the time set as described above.

As shown in FIG. 2, the ignition signal generator 32 of the plasma starting section 23A applies a current to the primary side of the ignition coil and applies a high voltage to the electrode portion of the spark plug 34 in accordance with the starting signal. A spark is discharged at the electrode portion of the spark plug 34, and a small-scale plasma is generated. The direct-current pulse power supply device 35 of the microwave radiation section 24A supplies power to the magnetron 36 according to the assist signal. The magnetron 36 receives the supplied power and generates microwaves. The microwaves are transmitted to the antenna 40 via the microwave transmission path. As a result, microwaves are radiated into the cavity 22A during the period from the start time to the end time of microwave oscillation. The plasma generated by the spark discharge is energized by the microwaves, and expands inside the processing chamber 21A.

Through this sequence of operations of the first gas processing unit 20A, the discharge by the spark plug gives rise to plasma formation, and generation of plasma is ended by ending the radiation of microwaves. As a result, plasma is repeatedly generated for the plasma generation period and duration set by the central control section 11.

When gas is introduced to the first processing chamber 21A in which plasma has been generated as described above, the component to be processed in the gas is degraded and processed by the plasma, the heat of the plasma, or the reactive components formed by the plasma. Formaldehyde, for example, is degraded at a high degradation rate of 90% or higher. The processed gas is discharged via the gas transfer section 3, second processing chamber 21B, and gas discharge section 4 shown in FIG. 1.

When the measurement conducted in the second gas sensing section 5B indicates that the concentration of the component to be processed in the gas exceeds a reference value, the central control section 11 outputs a unit instruction signal to the second unit control section 12B so as to cause the second gas processing unit 20B to execute plasma processing as well. The second unit control section 12B and the second gas processing unit 20B execute the same operations as the first unit control section 12A and the first gas processing unit 20A in response to this unit instruction signal. The gas introduced into the second processing chamber 21B is thereby again processed using plasma. The gas is thereby further degraded.

The following two policies are assumed regarding the timing at which plasma is generated by the second gas processing unit 20B. Specifically, plasma is further applied to the component to be processed and modified by plasma, or plasma is applied to gas that has passed through the processing chamber 21A during the period in which plasma was not being generated by repeated oscillation thereof. In any of these cases, the appropriate timing for plasma generation in the second gas processing unit 20B can be determined based on the speed of the gas passing through each of the gas processing units 20A and 20B.

The latter policy is effective in the case of heat processing with high-temperature plasma. Since the plasma becomes extremely hot when plasma is continuously generated by one gas processing unit, the risk of damage due to heat increases. The gas also does not readily pass through regions of high-temperature plasma. When plasma is generated by the latter timing policy, the same processing efficiency that is obtained by continuously generating plasma and processing by a single gas processing unit can be obtained at a higher flow quantity, and a cooling period can also be provided for each gas processing unit to reduce the risk of damage due to heat. The latter policy also makes it possible to reduce leakage of the gas being processed, and is therefore effective when the microwave pulse duration is short, or the flow rate of the gas is high.

OPERATION EXAMPLE 3

When the concentration of an aromatic compound in the gas exceeds the allowed value, the central control section 11 selects an operation for activating both of the gas processing units 20A and 20B. When this selection is made, the gas processing apparatus 1 executes the same operation as in Operation Example 2 in which both the gas processing units 20A and 20B are activated. However, in this case, the second gas processing unit 20B generates plasma at a timing whereby plasma is further applied to the component processed and modified by plasma in the first gas processing unit 20A.

When air containing an aromatic compound is introduced as the gas to the first gas processing unit 20A, the first gas processing unit 20A modifies the aromatic compound in the gas into an oxygen-containing organic compound through the use of plasma, heat of the plasma, or reactive components formed by the plasma. Specifically, a six-member ring of the aromatic compound is broken, and an oxygen atom is bonded to the molecule.

When the gas processed by the first gas processing unit 20A is introduced to the second gas processing unit 20B via the gas transfer section 3, the second gas processing unit 20B oxidizes and degrades the oxygen-containing organic compound through the use of plasma, heat of the plasma, or reactive components formed by the plasma.

[Addition of Water]

In the gas processing apparatus 1 according to the present embodiment, the moisture addition sections 6A and 6B add moisture in accordance with control performed by the central control section 11 during the processing performed in Operation Examples 2 and 3 described above. The added moisture forms OH radicals when acted upon by thermal non-equilibrium plasma. In the case of processing gas through the use of highly oxidative reactive components, when there are large quantities of OH radicals, the process quantity and the processing efficiency correspondingly increase. Gas can therefore be effectively processed when moisture is added in a case in which the plasma temperature conditions are set to a non-equilibrium state.

A thermal non-equilibrium state of the plasma occurs during the period from the first several nanoseconds to several hundred nanoseconds each time a plasma is generated. Therefore, a thermal non-equilibrium plasma can be formed by reducing the plasma generation period to such a degree that the temperature of the gas does not increase. The quantity of OH radicals effectively acting in gas processing is therefore increased without the OH radicals being inactivated by heat. The amount of gas processed per unit time can thus be increased by shortening the period during which plasma is generated in one cycle. Water may be added when plasma is generated in this manner.

[Preferred Operational Effects of the Present Embodiment]

As described above, the gas processing apparatus 1 of the present embodiment applies plasma twice to an aromatic compound. The aromatic compound is modified into an oxygen-containing organic compound by the first processing, and is degraded and purified by the second processing. In gas processing using the plasma generated by the method of the present embodiment, the rate of modification from an aromatic compound to an oxygen-containing organic compound is extremely high.

For example, when air containing about 80 ppm of toluene is processed once by plasma in the gas processing apparatus of the present embodiment, and the processed gas is qualitatively analyzed by gas chromatograph mass spectrometry, all of the components detected have been found to be oxygen-containing organic compounds. In gas processing using plasma generated by the gas processing apparatus of the present embodiment, the degradation rate of oxygen-containing organic compounds is high, exceeding 90% in a single cycle of plasma processing for formaldehyde and other compounds. A high degree of degradation of aromatic compounds can be obtained by processing twice using plasma in this manner. Such performance in gas processing can be obtained even when the gas flow rate is on the order of several tens of meters per second to the speed of sound.

There is no need for dielectric beads or a binder in the gas processing apparatus of the present embodiment. Moreover, plasma is expanded by supplying energy to the plasma using microwaves emitted using an antenna. This expansion of the plasma increases the volume of the plasma in three dimensions. Consequently, large quantities of gas can be processed without preparing electrodes with a wide surface area, such as in a gas processing apparatus that uses parallel panel electrodes. Furthermore, by appropriately selecting the duration of microwave oscillation, it is possible to perform any of direct ionization or dissociation of the component to be processed, and utilization of heat processing and thermal non-equilibrium plasma to perform chemical processing using reactive components, and versatility is increased.

Furthermore, there is no obstruction of the gas flow channel by dielectric beads, binders, electrodes, or the like, the plasma can be expanded by microwaves, and processing can be performed in one pass. High-speed, high-flow processing is therefore possible.

Furthermore, since a state analogous to ashing occurs on the internal surface of the reaction chamber each time the plasma is generated, a self-cleaning is automatically performed. Retention of gas can thereby be prevented. Maintenance properties are also enhanced.

[Modification]

Figure 10:
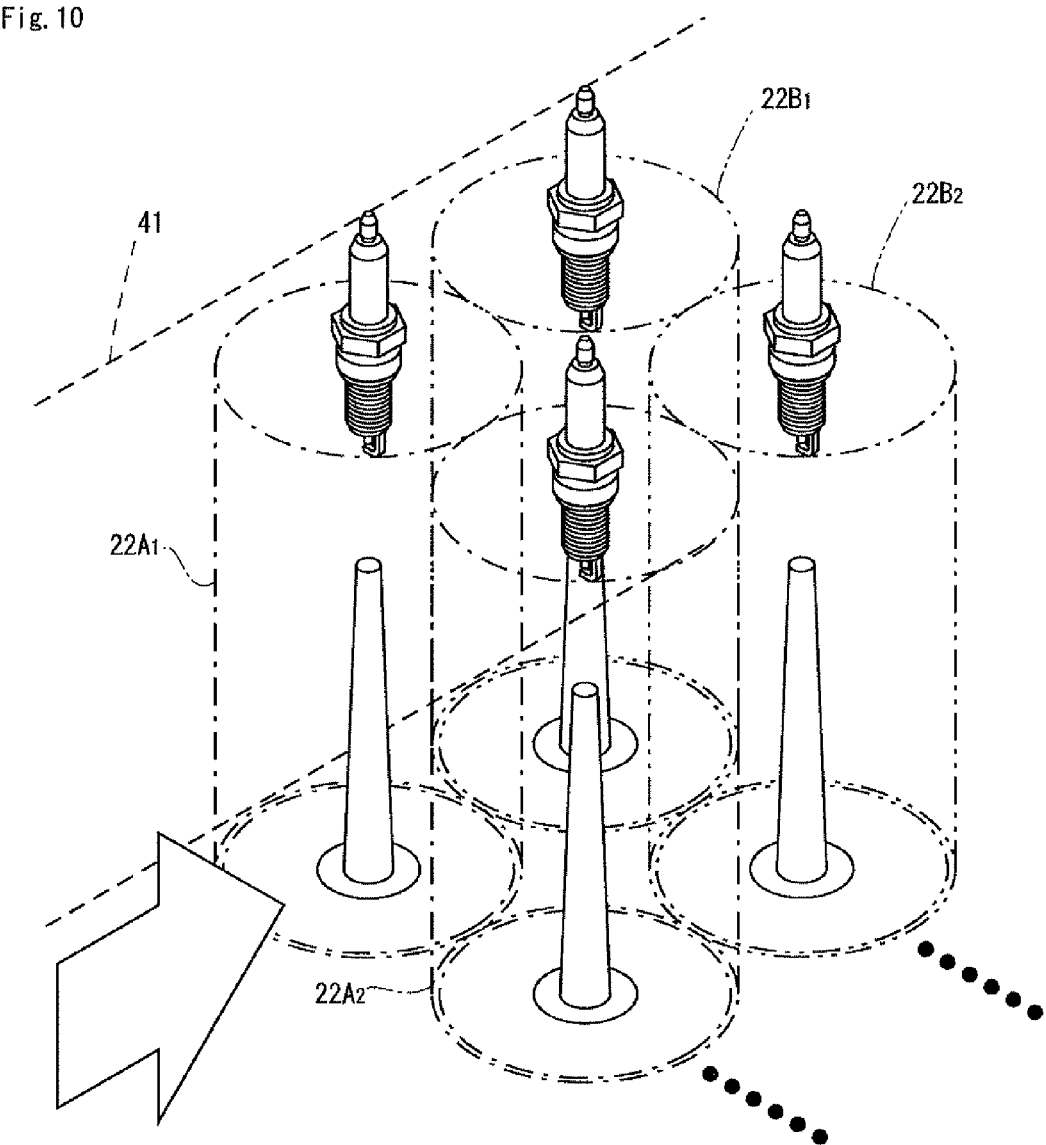
FIG. 10 is a perspective view showing an example of a parallel arrangement of cavities in the duct.

In the embodiment described above, gas is processed using two gas processing units, but an increased amount of flow can be processed by arranging a group of gas processing units $22A_1$, $22B_1$, $22A_2$, $22B_2$ in parallel as shown in FIG. 10, for example.

Figure 11:
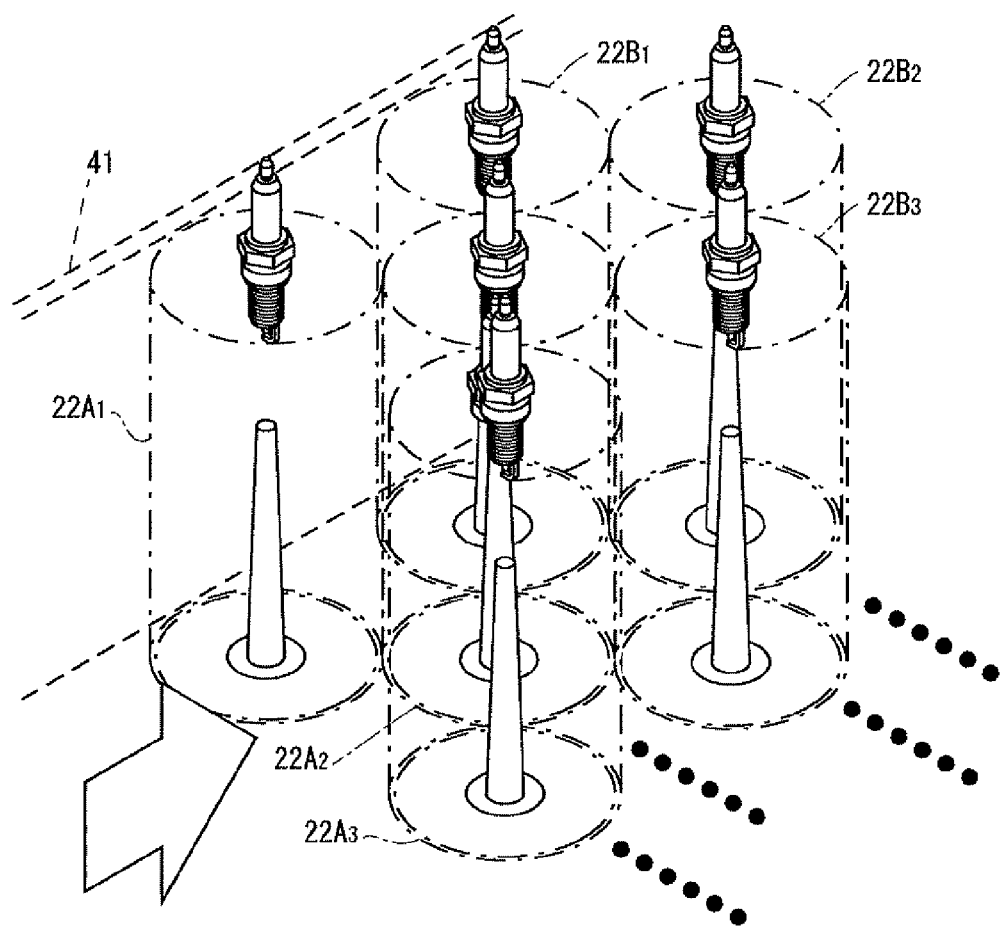
FIG. 11 is a perspective view showing an example of a staggered arrangement of cavities in the duct.

Gas processing units $22A_1$, $22B_1$, $22A_2$, $22B_2$, $22A_3$, $22B_3$ may also be arranged in staggered fashion as shown in FIG. 11. When the heat of plasma is utilized to process gas, the plasma and the area of the vicinity thereof attain high temperatures and pressures, and gas flows less readily. By arranging the gas processing units $22A_1$, $22B_1$, $22A_2$, $22B_2$, $22A_3$, $22B_3$ in such a staggered pattern, the gas flows toward the gas processing unit of the subsequent row in such a manner as to avoid the regions of high temperature and pressure, and gas flow can therefore be promoted while plasma processing is reliably performed.

A configuration such as the following is also effective at introducing gas into a region in which high-temperature, high-pressure plasma is generated. For example, a configuration may be adopted in which a baffle plate or fin is provided in a duct in which gas flows to restrict the direction of gas flow, and gas is directed toward the region in which the plasma is generated in the reaction chamber of the gas processing unit. A configuration may also be adopted in which the duct is bent, the gas near a wall surface having a high degree of curvature in the direction of gas flow is directed away from the wall surface, and the processing chamber is provided in the resulting high-pressure region (specifically, near the outside of the bent portion).

A configuration may also be adopted in which the duct is given a circular cross-sectional shape, a helical flow is formed by providing rifling on the inside wall, and the processing chamber is positioned adjacent to the inside wall.

Introduction of gas into the processing chamber may also be promoted by changing the cross-sectional area of a portion of the duct. For example, the cross-sectional area of the duct may be reduced in a portion thereof, and the processing chamber may be provided in or immediately below the narrowest portion of the duct. In this case, the difference in the pressure of the gas created by the change in cross-sectional area can be utilized to accelerate the flow of gas. The pressure in the region in which plasma is generated can also be reduced by increasing the cross-sectional area of the flow channel in the portion occupied by the processing chamber.

A configuration may also be adopted in which a blowhole for air is provided near the wall surface of the duct prior to the processing chamber, and air is blown in by a fan or the like at a flow rate faster than the gas from the blowhole. The blown air thereby forms an air curtain near the inside wall of the duct, and the flow of gas is accelerated. Water vapor or other vapor including moisture may also be blown instead of air. A draft port may also be provided near the wall surface of a stage subsequent to the gas processing unit, and gas drawn from the draft port by a pump or the like and fed back to the blowhole. By adopting a configuration in which the plasma inside the processing chamber is generated in the vicinity of the center of the cross-section of the duct, the gas near the wall surface, which is not readily processed by the plasma, can be circulated and reprocessed.

The fact that gas does not readily flow through the plasma region when a high-temperature plasma is formed may also be utilized to perform batch processing. Specifically, the second gas processing unit 20B provided on the downstream side is first activated, gas is processed by plasma, and a high-temperature region filling the whole processing chamber is formed by plasma. The flow of gas from upstream is thereby stagnated, and the density of the gas in the portion immediately in front of the second gas processing unit 20B temporarily increases. At this time, the first gas processing unit 20A on the upstream side is activated, the portion of the gas having increased density is processed, and this portion of gas is heated. The second gas processing unit 20B is stopped while the first gas processing unit 20A is operating. The heated processed gas rapidly flows downstream. By repeating such an operation, batch processing is accomplished in the space between the first gas processing unit and the second gas processing unit 20B.

In the embodiment described above, the cavity is a single-layer cylindrical wire mesh, but the shape of the cavity is not thus limited. It is sufficient insofar as the gas flows through and the microwaves radiated by the microwave radiation section 24A or 24B are prevented from escaping, and insofar as a resonance space is formed. For example, if the duct is made of metal, the wall surface thereof may be used as part of the cavity.

Figure 12:
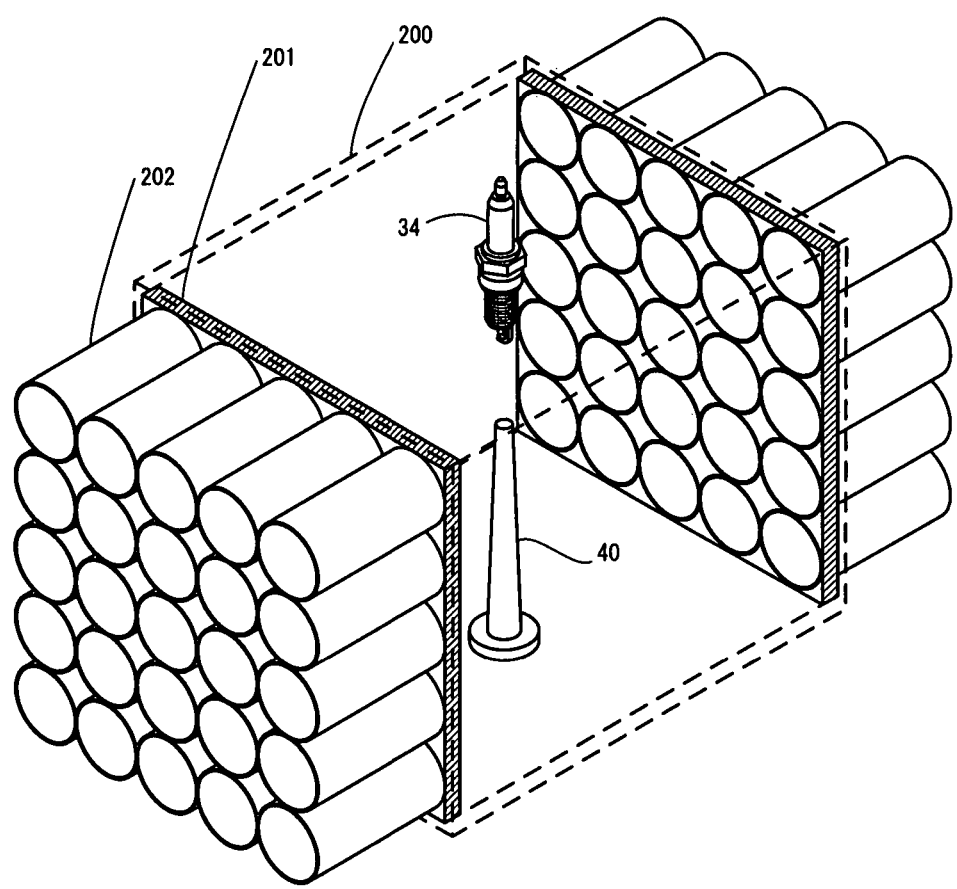
FIG. 12 is a perspective view showing another example of a cavity.

In order to prevent the escape of microwaves, a cavity may be used in which walls formed by bundles of a plurality of pipes 202 supported by a support panel 201 are arranged in the direction of gas flow as shown in FIG. 12, for example. The pipes 202 are arranged in bundles on the introduction side and discharge side of the cavity, and the axial direction of each pipe is aligned with the flow direction of the gas. The support panel 201 has openings corresponding to the pipes 202.

When such a cavity is used, the microwaves can be prevented from escaping by making the inside diameter of the pipes 202 less than about $\frac{1}{4}^{th}$ the wavelength of the microwaves, and making the length of the pipes 202 about $\frac{1}{4}^{th}$ or more of the wavelength. Such a cavity enables a large open area ratio to be obtained in the cross-sectional direction of the duct, and the flow of gas is unobstructed. Noise reduction effects can also be anticipated by selecting the appropriate diameter and length for the pipes 202.

In the embodiments described above, processing of gas using plasma is executed over the course of two stages, but gas processing units may also be provided for additional stages in such cases as when processing dioxins and other components that do not readily degrade, or when the concentration of the component to be processed in the gas is extremely high.

In the embodiment described above, the microwave radiation section generates microwaves through the use of a magnetron oscillating at 2.45 GHz, but the present invention is not limited to such a configuration. Specifically, the microwaves may be generated using an oscillator in which an LC circuit or other oscillator circuit and a modulator are combined. A so-called semiconductor oscillator may also be used. The frequency of the microwaves is not limited to 2.45 GHz, and another frequency may be used. A composite wave may also be used that includes a plurality of frequency components.

A spark plug is also used as the plasma starting section in the embodiment described above, but the method of starting the plasma is not limited to such a method. For example, the plasma starting method is not limited to the use of a spark plug, and an electrode for producing a small-scale discharge may be used. The plasma may also be generated by a laser light or the like.

Gas may also be merged from another flow channel partway in the series of connected gas processing units. The gas may also be divided into another flow channel partway in the series of connected gas processing units. A gas processing unit or gas processing apparatus may also be provided in the other flow channels. By controlling the gas processing units of the other flow channels independently or integrally, rather than having only a multistage series process, gases that are processed using plasma can be mixed together and parts thereof used for other applications. Chemical components can be modified and generated by various processing particularly when such a configuration is used in-plant.

The gas processing units may be controlled and driven so that the frequency distribution and phase of the electromagnetic waves; the position, direction, and number of radiation sources of the electromagnetic waves; and the disturbance, time fluctuation, and spatial distribution of the strength of the electric field generated by the electromagnetic waves are selected on the basis of at least one of the average, total, maximum value, minimum value, dispersion, disturbance, time fluctuation, spatial distribution, variance, and pattern relating to at least one of the quantity of flow, flow rate, concentration, mixture ratio of components, pressure, and temperature of the introduced gas, and the selected time fluctuation and spatial distribution are produced.

[Exhaust Processing System Using the Gas Processing Apparatus]

The exhaust gas of an internal combustion engine can also be cleaned using the gas processing apparatus 1. For example, a plurality of gas processing units may be provided in a section from the combustion chamber of the internal combustion engine to the terminal end of the exhaust pipe. The components of the exhaust gas of an internal combustion engine vary according to the state of operation of the engine. Consequently, the control device 10 determines the number of gas processing units to activate while monitoring the exhaust components through the use of the gas sensing sections 5A, 5B. Alternatively, the control device 10 may determine the number of gas processing units to activate while monitoring the operating state of the internal combustion engine. The operating state may be monitored by receiving information relating to the operating state from an engine control unit (ECU), for example. Alternatively, information may be received directly from an oxygen sensor, temperature sensor, pressure sensor, crank angle detector, and other components provided in advance to the internal combustion engine.

The operating timing of the gas processing units can be determined by the control device 10 on the basis of information relating to the crank angle, valve opening/closing timing, and other characteristics by correcting for the difference in time taken for the exhaust to pass through from the combustion chamber to the gas processing units.

The internal combustion engine as the source of the exhaust gas to be processed may be of any type. The internal combustion engine may be a piston engine or a rotary engine. The internal combustion engine may also be a gas turbine, ram engine, or the like. The ignition scheme may be spark ignition, autoignition, or compression ignition. Combustion may be performed by premixed flame or diffusion flame.

When the internal combustion engine has a plurality of cylinders, and the exhaust pipe has a converging structure, all of the gas processing units may be disposed upstream from the converging portion of the exhaust pipe, all of the gas processing units may be disposed downstream from the converging portion of the exhaust pipe, or some of the gas processing units may be disposed upstream and some downstream from the converging portion of the exhaust pipe. A separate gas introduction channel may also be provided upstream from the gas processing units or between the gas processing units, and afterinjection performed.

The components, temperature, pressure, and other properties of the gas flowing into the exhaust processing system may be adjusted by varying the air-fuel ratio in the cylinders or controlling combustion according to the route by which the exhaust gas is processed by plasma.

[Internal Combustion Engine in Which the Gas Processing Apparatus is Provided Inside the Combustion Chamber]

Figure 13:
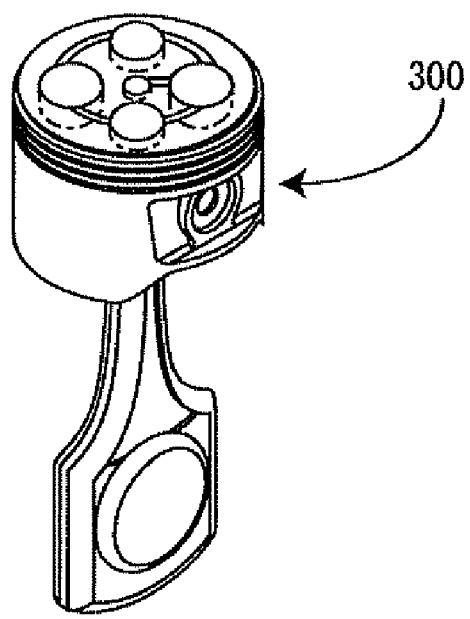
FIG. 13 is a view showing the piston used for implementing the present invention in a reciprocating internal combustion engine.

The gas processing apparatus 1 may be provided inside the combustion chamber of an internal combustion engine. FIG. 13 shows a piston used to implement this configuration in a reciprocating internal combustion engine. As shown in FIG. 13, a plurality of cavities is provided to the piston head portion of the piston 300. When the piston 300 is slid against the cylinder block, a plurality of auxiliary chambers is defined by the piston 300 and the cylinder head, and the cylinder block when the piston 300 is positioned near the top dead center. Each of the plurality of auxiliary chambers is communicated with at least one of the other auxiliary chambers. A plasma starting section 23 and a microwave radiation section 24 are positioned inside each of the auxiliary chambers. Each auxiliary chamber provides a processing chamber when the piston 300 is positioned near the top dead center.

The control section 10 activates the plasma starting sections 23 and the microwave radiation sections 24 in a sequence determined with respect to the auxiliary chambers. The working fluid inside the auxiliary chambers is ignited by the operation of the plasma starting sections 23 and microwave radiation sections 24. The ignition in this instance may be by the supply of heat energy from the plasma, or by autoignition of the working fluid that has been increased in reactivity by the action of the plasma. The working fluid flows out in conjunction with ignition and combustion from the first plasma starting section 23 and microwave radiation section 24 to be activated of the auxiliary chambers, and flows into the other auxiliary chambers. The inflowing working fluid and the working fluid already present in the auxiliary chamber mix together, and the components thereof change. The plasma starting section 23 and microwave radiation section 24 are then activated by a method that is in accordance with the components in the auxiliary chamber into which the working fluid has flowed. The working fluid in the auxiliary chamber also flows into another auxiliary chamber. All of the working fluid in the combustion chamber is combusted by the sequential formation of plasma according to the exchange of working fluid between auxiliary chambers and the inflow sequence of the working fluid. The progress of combustion is also determined by the path of communication between auxiliary chambers and the sequence of plasma formation. It is therefore possible to cause combustion to progress in the peripheral direction, for example. A swirling flow or the like can thereby be formed. Since the timing of combustion can be controlled from the center of the combustion chamber to the peripheral edge thereof, knocking and other effects are easily prevented. Furthermore, plasma can be applied multiple times to the working fluid, and incomplete combustion can be reduced. These effects contribute to cleaner exhaust gas and increased fuel efficiency.

[Other Modifications]

An example of adding moisture was described in the embodiment above, but excess moisture may also be removed using a filter or the like when too much moisture is present. Moisture may be added or removed by direct exchange of water, or water may be formed or removed from components in the gas by chemical reaction, plasma action, or other processes. Not only moisture, but the components, temperature, pressure, and other characteristics of the gas may be appropriately adjusted in the flow channel, and necessary components may be added or unwanted components removed in the gas processing. A configuration may also be adopted in which the removed components are temporarily stored, and the stored components are re-discharged in subsequent processing.

A cavity formed by bundled pipes was described as an example in the embodiment above, but a configuration may also be adopted in which the cross-sectional area of the gas flow channel is simply reduced to prevent the escape of electromagnetic waves.

A structure for preventing escape of electromagnetic waves may not necessarily be provided for each processing chamber. It is sufficient insofar as the escape of electromagnetic waves can be prevented or reduced upstream from the most upstream gas processing unit and downstream from the most downstream gas processing unit.

When the gas processing units are arranged in a matrix or in staggered formation, or when a converging or branched arrangement is adopted, the unit control sections may control the starting of plasma and the radiating of microwaves according to the arrangement of the gas processing units on the path of gas flow. Plasma can be appropriately formed according to the path of gas flow, and the efficiency of gas processing can be increased.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

The invention claimed is:

1. A gas processing apparatus using plasma; the gas processing apparatus comprising:
   a plasma equipment series having a plurality of units of plasma equipment arranged in series on a gas flow channel; and
   a controller that controls the plurality of controlling the operation of each of the units of plasma equipment of the plasma equipment series;
   wherein each of the plurality of units of plasma equipment has a plasma generator for generating plasma within a reaction chamber communicated with the gas flow channel; and an electromagnetic wave radiator for radiating electromagnetic waves to the plasma generated by the plasma generator;
   wherein the controller selects the number of the plurality of units of plasma equipment to operate according to a component of the introduced gas,
   wherein the reaction chamber is communicated with the gas flow channel via a bundled plurality of pipes made of an electrical conductor wherein the bundled plurality of pipes is supported by a support panel, and the bundled plurality of pipes on said support panel form a cavity in the reaction chamber, and
   wherein the inside diameter of each of the bundled plurality of pipes is less than about ¼ th the wavelength of the electromagnetic waves, and the length of each of the bundled plurality of pipes is about ¼ th or more of the wavelength, for preventing the electromagnetic waves from escaping from said cavity.

2. The gas treatment device according to claim 1, wherein the plasma generator breaks bonds between carbon atoms and other atoms.

3. The gas processing apparatus according to claim 1, wherein
   the plasma generator breaks the bond of a carbon compound having at least one carbon-to-carbon bond and causes oxygen to bond where the carbon-to-carbon bond was broken.

4. The gas treatment device according to claim 3, wherein a unit of plasma equipment positioned farthest upstream in the gas flow channel among operating ones of the plurality of units of plasma equipment modifies the component having an aromatic six-member ring into an oxygen-containing organic compound.

5. The gas processing apparatus according to claim 1, wherein the controller activates two or more of the plurality of units of plasma equipment of the plasma equipment series when gas comprising a component having an aromatic six-member ring is conducted through the flow channel.

6. The gas processing apparatus according to claim 1, wherein three or more of the plurality of units of plasma equipment in the plasma equipment series are activated when gas containing a dioxin is conducted through the flow channel.

7. The gas treatment device according to claim 1, further comprising:
   a cavity for surrounding the reaction chamber;
   wherein the cavity comprises a wire mesh, prevents the escape of electromagnetic waves radiated by the electromagnetic wave radiator, and forms a resonance cavity for the electromagnetic waves.

8. The gas processing apparatus according to claim 1, wherein the controller selects the radiation time for the electromagnetic waves radiated by the electromagnetic wave radiator according to a component of the introduced gas.

9. The gas processing apparatus according to claim 1, further comprising:
   a humidity adjuster adjusting the moisture content in a gas flow channel further upstream than the plasma equipment.

10. The as processing apparatus according to claim 1, further comprising:
   a moisture addition portion introducing moisture into a gas flow channel further upstream than the unit of plasma equipment that has the electromagnetic wave radiator when the controller selects a time of 1 microsecond or less for the radiation time of electromagnetic waves by the electromagnetic wave radiator.

11. The gas processing apparatus according to claim 1, further comprising:
   an air curtain forming portion forming an air curtain for surrounding the periphery of the region in which gas is present and extending to the region in which plasma is generated by the plasma equipment.

12. The gas treatment device according to claim 1,
   wherein the number of the plurality of units of plasma equipment activated is increased when the quantity of the component reaches a predetermined reference quantity; and
   wherein a decision as to whether the quantity of the component has reached the reference quantity is made based on the flow rate of the gas or based on the concentration of the gas.

13. The gas processing apparatus according to claim 1, wherein when two or more of the plurality of units of plasma equipment are activated, the timing at which each unit of plasma equipment is activated is determined based on the difference in the time at which the gas reaches each unit of plasma equipment.

14. The gas processing apparatus according to claim 1, wherein
   a multiphase flow in which solid or liquid particles are mixed occurs in the gas; and
   the controller selects, according to the particles, the number of the plurality of units of plasma equipment activated.

15. The gas processing apparatus according to claim 1, wherein the gas flow channel is divided into another flow channel in between the plasma generators.

16. The gas processing apparatus according to claim 1, wherein the gas flow channel is merged with another flow channel in between the plasma generators.

17. The as processing apparatus according to claim 1, wherein the plasma equipment performs self cleaning of the inside of the reaction chamber by being activated.

18. A gas processing system comprising:
a plurality of the gas processing apparatuses according to claim 1;
wherein the plurality of units of the plasma equipment are arranged in a matrix or staggered lattice on the gas flow channel.

* * * * *